United States Patent
Han

(10) Patent No.: US 11,809,263 B2
(45) Date of Patent: Nov. 7, 2023

(54) ELECTRONIC CIRCUIT FOR CONTROLLING POWER

(71) Applicant: SAMSUNG ELECTRONICS CO., LTD., Suwon-si (KR)

(72) Inventor: Donghee Han, Hwaseong-si (KR)

(73) Assignee: SAMSUNG ELECTRONICS CO., LTD.

( * ) Notice: Subject to any disclaimer, the term of this patent is extended or adjusted under 35 U.S.C. 154(b) by 0 days.

(21) Appl. No.: 17/476,525

(22) Filed: Sep. 16, 2021

(65) Prior Publication Data

US 2022/0004249 A1    Jan. 6, 2022

Related U.S. Application Data

(63) Continuation of application No. 16/552,008, filed on Aug. 27, 2019, now Pat. No. 11,150,723.

(30) Foreign Application Priority Data

Jan. 3, 2019  (KR) .................. 10-2019-0000908

(51) Int. Cl.
  *G06F 1/3296*  (2019.01)
  *G06F 15/78*  (2006.01)
(52) U.S. Cl.
  CPC ........ *G06F 1/3296* (2013.01); *G06F 15/7807* (2013.01)
(58) Field of Classification Search
  CPC .................... G06F 1/3296; G06F 15/7807
  See application file for complete search history.

(56) References Cited

U.S. PATENT DOCUMENTS

| | | |
|---|---|---|
| 5,828,568 A | 10/1998 | Sunakawa et al. |
| 8,219,839 B2 | 7/2012 | Akimoto |
| 8,645,718 B2 | 2/2014 | Vamamoto et al. |
| 8,880,922 B2 | 11/2014 | Siba et al. |
| 9,477,243 B2 | 10/2016 | Rotem et al. |
| 2009/0144578 A1 | 6/2009 | Tatsumi |
| 2011/0022859 A1 | 1/2011 | More et al. |
| 2011/0238974 A1* | 9/2011 | Wells .............. G06F 1/3293 713/100 |

(Continued)

FOREIGN PATENT DOCUMENTS

| | | |
|---|---|---|
| JP | 5304265 B2 | 10/2013 |
| KR | 101641247 B1 | 7/2016 |

OTHER PUBLICATIONS

Singapore Examination Report dated Apr. 7, 2023, Cited in Corresponding SG Patent Application.

*Primary Examiner* — Nimesh G Patel
(74) *Attorney, Agent, or Firm* — Fish & Richardson P.C.

(57) ABSTRACT

An electronic circuit includes a converter and a controller. The converter outputs a first voltage for a first cluster and a second voltage for a second cluster. When a first power to be provided to the first cluster based on the first voltage is lower than a first available power of the first cluster and a second power to be provided to the second cluster based on the second voltage is higher than a second available power of the second cluster, the controller outputs a first interrupt signal such that a level of the second voltage is adjusted based on a sum of the first power and the second power and a first threshold value determined based on the first available power and the second available power.

18 Claims, 15 Drawing Sheets

(56) References Cited

U.S. PATENT DOCUMENTS

| | | | |
|---|---|---|---|
| 2012/0144215 A1* | 6/2012 | Naffziger | G06F 1/26 |
| | | | 713/340 |
| 2014/0063026 A1 | 3/2014 | Oh | |
| 2015/0268678 A1* | 9/2015 | Yu | G05F 1/46 |
| | | | 327/540 |
| 2016/0013643 A1* | 1/2016 | Park | H02J 1/08 |
| | | | 713/300 |
| 2016/0054788 A1 | 2/2016 | Gulati et al. | |
| 2016/0066280 A1 | 3/2016 | Heo et al. | |
| 2016/0179110 A1* | 6/2016 | Rotem | G06F 1/324 |
| | | | 327/538 |
| 2017/0123482 A1* | 5/2017 | Berke | G06F 1/3296 |
| 2017/0185134 A1 | 6/2017 | Han et al. | |
| 2017/0277238 A1 | 9/2017 | Park et al. | |
| 2018/0060085 A1 | 3/2018 | Ananthakrishnan | |
| 2018/0120910 A1 | 5/2018 | Farkas et al. | |
| 2019/0011971 A1 | 1/2019 | Yanggong | |
| 2019/0129490 A1 | 5/2019 | Han et al. | |
| 2020/0210184 A1* | 7/2020 | Weissmann | G06F 1/329 |

\* cited by examiner

ELECTRONIC CIRCUIT FOR CONTROLLING POWER

CROSS-REFERENCE TO RELATED APPLICATIONS

This is a Continuation of U.S. application Ser. No. 16/552,008, filed Aug. 27, 2019, and a claim of priority under 35 U.S.C. § 119 is made to Korean Patent Application No. 10-2019-0000908 filed on Jan. 3, 2019, in the Korean Intellectual Property Office, the disclosures of which are incorporated by reference herein in their entireties.

BACKGROUND

Embodiments of the disclosure described herein relate to an electronic circuit, and more particularly, relate to an electronic circuit for controlling power that is supplied to a system on chip (SoC).

As information communications develop, electronic devices such as a mobile device include high-performance processors for the purpose of processing a large amount of data quickly. For example, an electronic device may include processors such as a central processing unit (CPU), a graphic processing unit (GPU), and a neural-network processing unit (NPU). Also, a processor may include one or more cores.

The processor processes a large amount of data in a unit of work. The processor allocates works to cores through scheduling. For the processor to process a large amount of data, a large amount of works may be allocated to one core included in the processor. A core consumes a large amount of power for the purpose of processing a large amount of works.

A power management integrated circuit (PMIC) manages power that is provided to cores included in a processor. Since a high-performance processor consumes a large amount of power, it may be necessary to efficiently manage the power that is provided to the processor. Accordingly, a configuration and an operation of the PMIC for efficiently managing power that is provided to a processor are being developed.

SUMMARY

Embodiments of the disclosure provide an electronic circuit configured to calculate power to be provided to a system on chip (SoC) and generate an interrupt signal for adjusting power, which the SoC consumes, based on the calculated power.

According to an example embodiment, an electronic circuit may include a converter and a controller. The converter may output a first voltage for a first cluster and a second voltage for a second cluster. When a first power to be provided to the first cluster based on the first voltage is lower than a first available power of the first cluster and a second power to be provided to the second cluster based on the second voltage is higher than a second available power of the second cluster, the controller may output a first interrupt signal such that a level of the second voltage is adjusted, based on a sum of the first power and the second power and a first threshold value determined based on the first available power and the second available power.

BRIEF DESCRIPTION OF THE FIGURES

The above and other objects and features of the disclosure will become apparent by describing in detail example embodiments thereof with reference to the accompanying drawings.

DETAILED DESCRIPTION

Below, embodiments of the disclosure may be described in detail and clearly to such an extent that an ordinary one in the art easily implements the disclosure.

Figure 1:
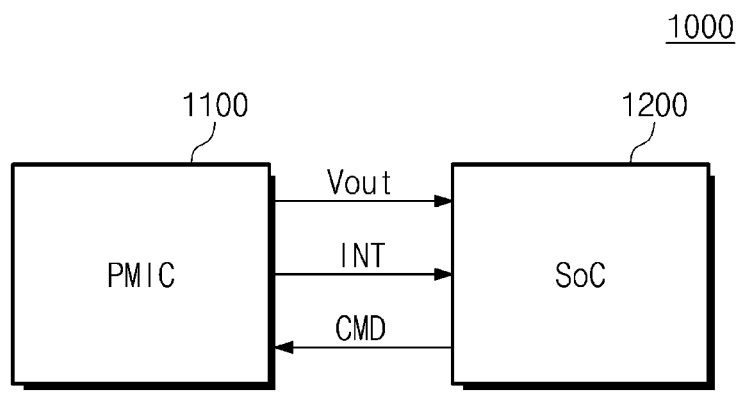
FIG. 1 is a block diagram illustrating a power system according to an embodiment of the disclosure.

FIG. 1 is a block diagram illustrating a power system according to an embodiment of the disclosure.

Referring to FIG. 1, a power system 1000 may include a power management integrated circuit (PMIC) 1100 and a system on chip (SoC) 1200.

The SoC 1200 may output a signal CMD to the PMIC 1100 for the purpose of controlling operations of the PMIC 1100. For example, the signal CMD may be associated with a level of a voltage Vout and a signal INT to be output by the PMIC 1100. Example operations of the PMIC 1100 that is controlled by the signal CMD will be more fully described with reference to FIG. 4. The PMIC 1100 may output the voltage Vout to the SoC 1200. The voltage Vout may be used for an operation of the SoC 1200. The PMIC 1100 may output, to the SoC 1200, the signal INT associated with an available power of the SoC 1200.

In the specification, the "available power" is associated with a maximum value of power that a component (e.g., a semiconductor chip or an electronic circuit included in the semiconductor chip) of an electronic device may consume. However, the available power means a value which is set by a designer of an electronic circuit, or by any other electronic circuit configured to control an electronic circuit, and does not mean a maximum value of power which is required for a normal operation of an electronic circuit.

For example, the available power of the SoC 1200 may be set to "Pa". The SoC 1200 may operate normally based on power of "Pb" greater than "Pa", but the SoC 1200 may be designed to consume only power that is not greater than "Pa" which is set as the available power. For example, in the case where the event that the SoC 1200 consumes power greater than "Pa" is detected, power consumed by the SoC 1200 may be limited to "Pa" by operations of the PMIC 1100 and the SoC 1200.

An available power may also be set with regard to respective components included in the SoC 1200. The PMIC 1100 may control the SoC 1200 such that the components included in the SoC 1200 do not consume power greater than the available power of the SoC 1200. For example, the PMIC 1100 may control the SoC 1200 such that each component included in the SoC 1200 does not consume power exceeding an available power of each component. Alternatively, in an embodiment of the disclosure, the PMIC 1100 may be configured to permit the event that power that is consumed by a component of the SoC 1200 exceeds an available power of the component under appropriate conditions.

In the example of FIG. 1, the PMIC 1100 may output the signal for adjusting power, which is consumed by an electronic circuit included in the SoC 1200, to the SoC 1200 based on an available power of the electronic circuit. For example, the SoC 1200 may request the voltage Vout having a desired level based on the signal CMD. The PMIC 1100 may calculate power to be provided to the SoC 1200 based on a voltage of the requested level. When the calculated power is greater than a threshold value, the PMIC 1100 may output the signal INT for limiting power to be consumed by the electronic circuit.

An example is illustrated in FIG. 1 in which each of the voltage Vout and the signal INT is one signal; however, the voltage Vout may include one or more voltages and the signal INT may include one or more signals. For example, in the case where the SoC 1200 includes a plurality of electronic circuits, the voltage Vout may include voltages to be respectively output to the plurality of electronic circuits and the signal INT may include signals for controlling the plurality of electronic circuits.

For better understanding, although an example of the PMIC 1100 configured separately with the SoC 1200 is illustrated in FIG. 1, instead of the PMIC 1100 of FIG. 1, a component configured to perform an operation similar to the operation of the PMIC 1100 may be included in the SoC 1200. For example, a component configured to perform an operation similar to the operation of the PMIC 1100 may be positioned within the SoC 1200.

Figure 2:
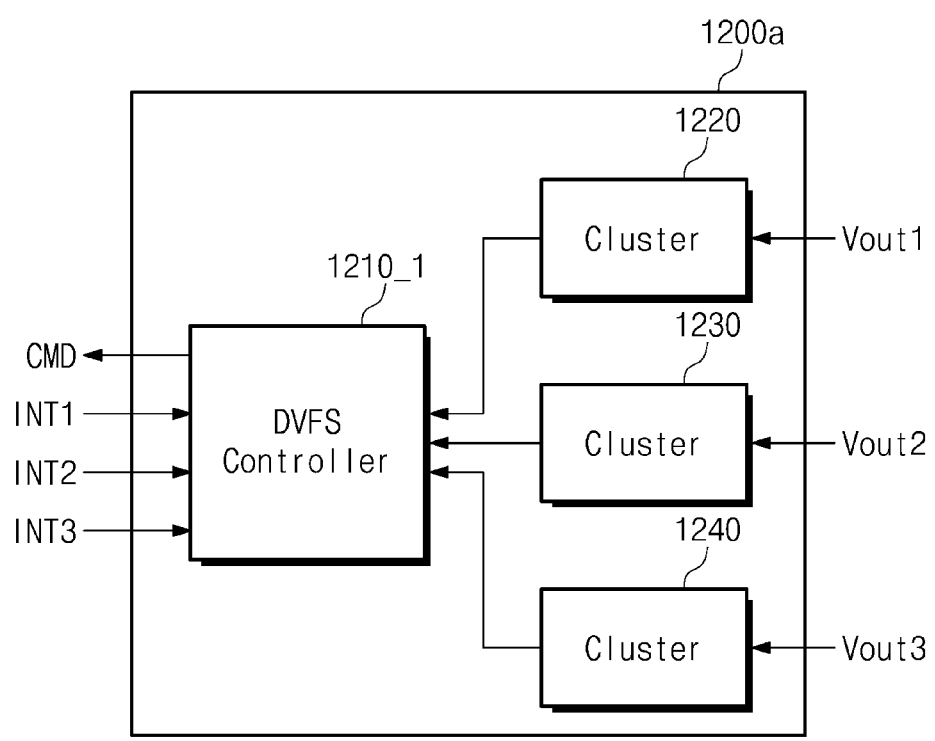
FIG. 2 is a block diagram illustrating an example configuration of a system on chip (SoC) of FIG. 1.

FIG. 2 is a block diagram illustrating an example configuration of an SoC of FIG. 1.

The SoC 1200 of FIG. 1 may include an SoC 1200a of FIG. 2. The voltage Vout of FIG. 1 may include voltages Vout1 to Vout3 of FIG. 2. The signal INT of FIG. 1 may include signals INT1 to INT3 of FIG. 2. Referring to FIG. 2, the SoC 1200a may include a dynamic voltage and frequency scaling (DVFS) controller 1210_1 and clusters 1220 to 1240. The SoC 1200a including the three clusters 1220 to 1240 will be described with reference to FIG. 2, but it may be understood that the number of clusters included in the SoC 1200a may be variously changed.

Each of the clusters 1220 to 1240 may include at least one of various forms of processing units. For example, each of the clusters 1220 to 1240 may include at least one of a central processing unit (CPU), a graphic processing unit (GPU), a neural-network processing unit (NPU), etc. Processing units included in each of the clusters 1220 to 1240 may process data in parallel.

The clusters 1220 to 1240 may receive the voltages Vout1 to Vout3 from the PMIC 1100, respectively. The clusters 1220 to 1240 may operate based on the received voltages Vout1 to Vout3. For example, the clusters 1220 to 1240 may process tasks associated with operations of an electronic device including the SoC 1200 based on the voltages Vout1 to Vout3 (refer to FIG. 16).

For example, a lot of tasks may be allocated to the cluster 1220. To process the allocated tasks, the cluster 1220 may operate based on a clock of a high frequency. The DVFS controller 1210_1 may perform various control operations for increasing a frequency (hereinafter referred to as an "operating frequency") of a clock that is provided to the cluster 1220. For example, the DVFS controller 1210_1 may control a clock management unit (CMU) (not illustrated) providing a clock to the cluster 1220 for the purpose of increasing a frequency of a clock that is supplied to the cluster 1220.

To operate based on the increased operating frequency, the cluster 1220 may consume a large amount of power. Accordingly, the voltage Vout1 of an increased level may be required for an operation of the cluster 1220. The DVFS controller 1210_1 may calculate a level of the voltage Vout1 corresponding to the increased operating frequency of the cluster 1220.

The DVFS controller 1210_1 may output the signal CMD to the PMIC 1100 for the purpose of adjusting a level of the voltage Vout1. For example, the DVFS controller 1210_1 may output the signal CMD to the PMIC 1100 for the purpose of requesting the voltage Vout1 of the calculated level. Afterwards, the cluster 1220 may receive the voltage Vout1 of the increased level from the PMIC 1100. The cluster 1220 may operate with high performance by consuming a lot of power based on the received voltage Vout1. Accordingly, even though a large amount of works is allocated to the cluster 1220, the cluster 1220 may process the allocated works.

As described with reference to FIG. 1, each of the clusters 1220 to 1240 may have an available power. The DVFS controller 1210_1 may perform various control operations in response to the signals INT1 to INT3 received from the PMIC 1100 such that powers being consumed by the clusters 1220 to 1240 do not exceed respective available powers.

For example, in response to the signal INT1, the DVFS controller 1210_1 may perform various control operations for limiting an operating frequency of the cluster 1220 such that power being consumed by the cluster 1220 does not exceed the available power of the cluster 1220. For example, the DVFS controller 1210_1 may control the clock control unit for the purpose of decreasing a frequency of a clock being provided to the cluster 1220. Afterwards, the cluster 1220 may consume power not greater than the available power, based on the decreased operating frequency.

However, as will be described with reference to FIGS. 6 to 11, under an appropriate condition according to embodiments of the disclosure, maximum values (hereinafter referred to as "threshold values") of powers to be provided to the clusters 1220 to 1240 may be changed by operations of the PMIC 1100. Accordingly, each of the clusters 1220 to 1240 may consume power exceeding the corresponding available power under the appropriate condition.

Operations of the respective clusters 1230 and 1240 are similar to the operation of the cluster 1220 performed under control of the DVFS controller 1210_1, and thus, additional description will be omitted to avoid redundancy.

Figure 3:
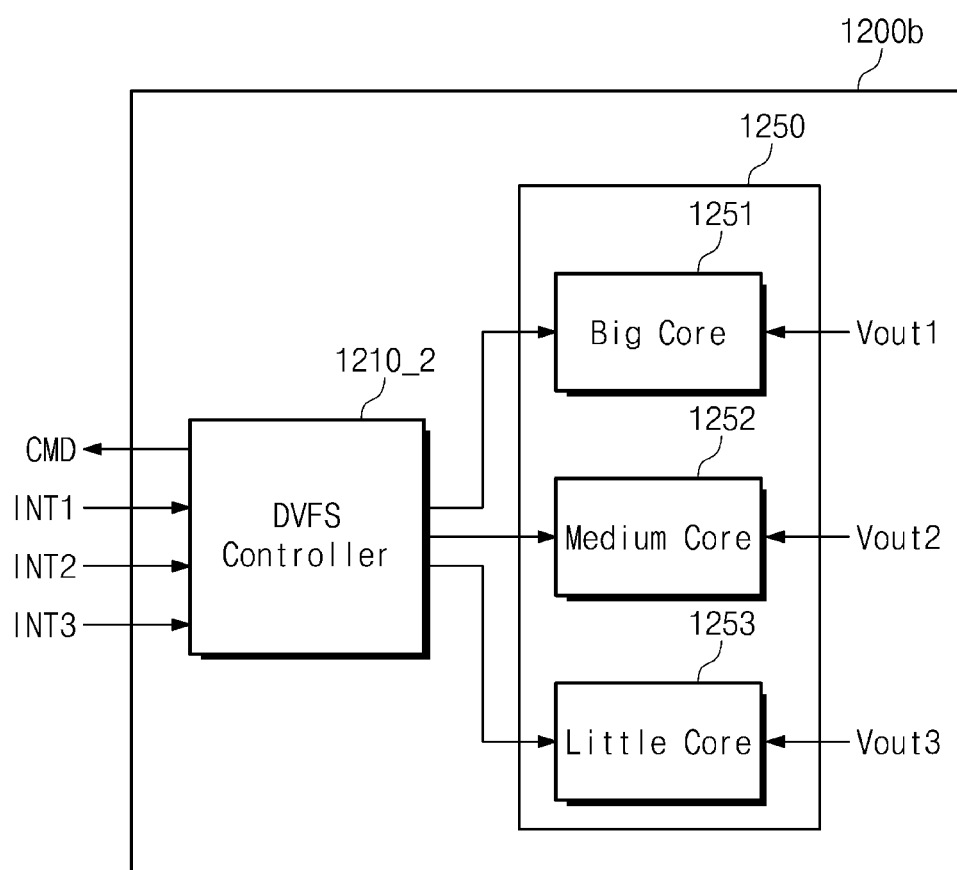
FIG. 3 is a block diagram illustrating an example configuration of an SoC of FIG. 1.

FIG. 3 is a block diagram illustrating an example configuration of an SoC of FIG. 1.

The SoC 1200 of FIG. 1 may include an SoC 1200b of FIG. 3. The voltage Vout of FIG. 1 may include voltages Vout1 to Vout3 of FIG. 3. The signal INT of FIG. 1 may include signals INT1 to INT3 of FIG. 3. Referring to FIG. 3, the SoC 1200b may include a DVFS controller 1210_2 and a processing unit 1250.

The processing unit 1250 may include a big core 1251, a medium core 1252, and a little core 1253 that have different performances and different efficiencies. For brevity of description, in the specification, the big core 1251, the medium core 1252, and the little core 1253 may be respectively referred to as a "core 1251", a "core 1252", and a "core 1253". Alternatively, the big core 1251, the medium core 1252, and the little core 1253 may be respectively referred to as "cores 1251 to 1253".

The cores 1251 to 1253 may receive the voltages Vout1 to Vout3 from the PMIC 1100. The cores 1251 to 1253 may operate based on the received voltages Vout1 to Vout3, respectively. For example, the cores 1251 to 1253 may process works associated with operations of an electronic device including the SoC 1200b based on the voltages Vout1 to Vout3 (refer to FIG. 16).

For example, the processing unit 1250 may include at least one of a central processing unit (CPU), a graphic processing unit (GPU), a neural-network processing unit (NPU), etc. The processing unit 1250 including the three cores 1251 to 1253 will be described with reference to FIG. 3, but it may be understood that the number of cores included in the processing unit 1250 may be variously changed.

For example, a performance of the big core 1251 may be higher than a performance of the medium core 1252. The performance of the medium core 1252 may be higher than a performance of the little core 1253. For example, an operating frequency of the big core 1251 may be higher than an operating frequency of the medium core 1252 and the operating frequency of the medium core 1252 may be higher than an operating frequency of the little core 1253. Accordingly, power consumption of the big core 1251 may be greater than power consumption of the medium core 1252 and the power consumption of the medium core 1252 may be greater than power consumption of the little core 1253.

An available power "Pmax1" of the big core 1251, an available power "Pmax2" of the medium core 1252, and an available power "Pmax3" of the little core 1253 may be set in consideration of powers that are consumed by the cores 1251 to 1253. The available power "Pmax1" of the big core 1251 may be greater than the available power "Pmax2" of the medium core 1252, and the available power "Pmax2" of the medium core 1252 may be greater than the available power "Pmax3" of the little core 1253.

The processing unit 1250 of a big-medium-little structure is described with reference to FIG. 3, but it may be understood that the processing unit 1250 is configured based on various structures. For example, the processing unit 1250 may include a plurality of cores configured to have substantially the same performance. Alternatively, the processing unit 1250 may be implemented in a big-little structure.

Example configurations and operations of the DVFS controller 1210_2 are similar to the example configurations and operations of the DVFS controller 1210_1 described with reference to FIG. 2, and thus, additional description will be omitted to avoid redundancy.

For better understanding, an example PMIC 1100 that exchanges the voltage Vout, the signal INT, and the signal CMD with the SoC 1200b of FIG. 3 will be described with reference to FIGS. 4 to 15. However, it may be understood that the PMIC 1100 may be variously changed and modified to exchange the voltage Vout, the signal INT, and the signal CMD with the SoC 1200 including a plurality of clusters and a plurality of cores as well as the SoC 1200a of FIG. 2.

Figure 4:
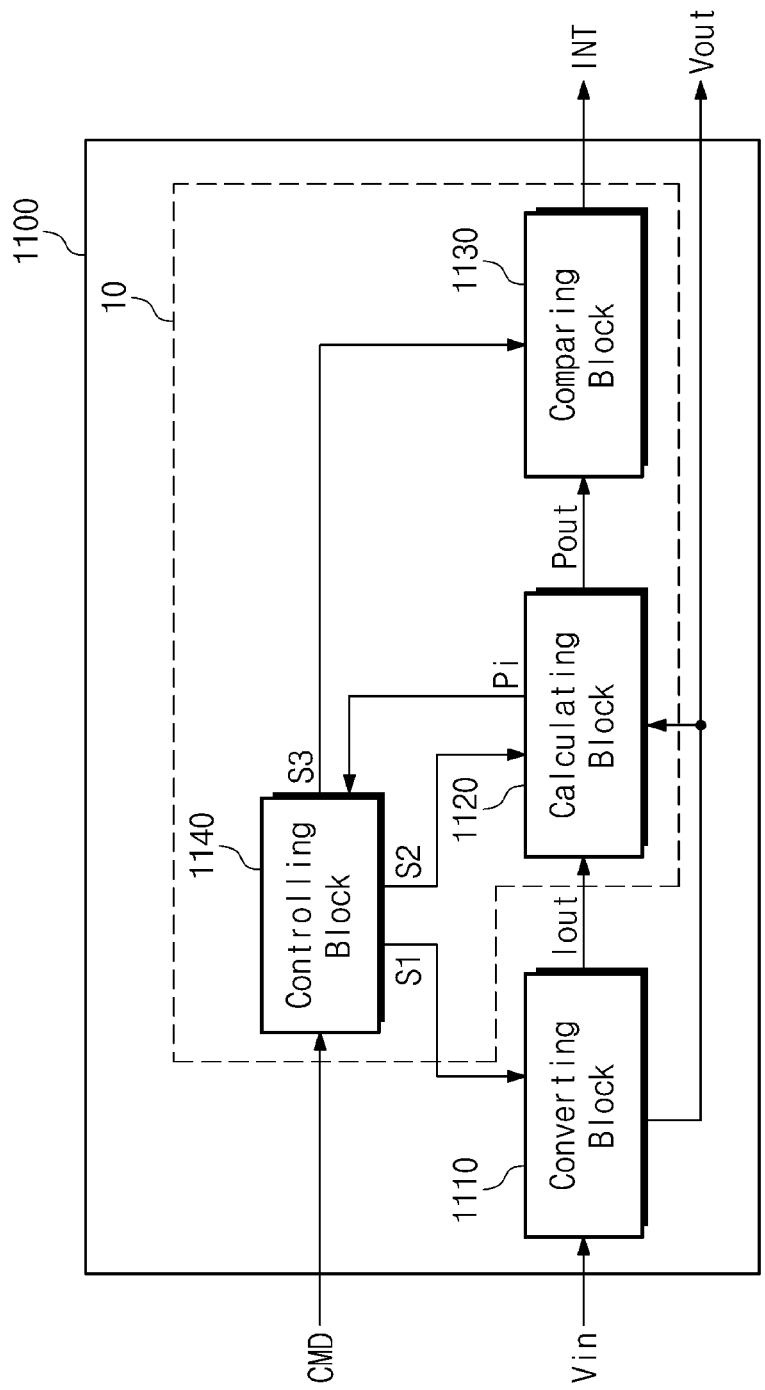
FIG. 4 is a block diagram illustrating an example configuration of a power management integrated circuit (PMIC) of FIG. 1.

FIG. 4 is a block diagram illustrating an example configuration of a PMIC of FIG. 1.

Referring to FIG. 4, the PMIC 1100 may include a converting block 1110 and a controller 10. The controller 10 may include a calculating block 1120, a comparing block 1130, and a controlling block 1140.

The controller 10 and components of the controller 10 may include hardware circuits (e.g., analog circuits and/or logic circuits) configured to perform operations that are described in the present disclosure. In some cases, the controller 10 may be a general-purpose/special-purpose controller or a microcontroller implemented with an application specific integrated circuit (ASIC) or a field programmable gate array (FPGA). Alternatively, the controller 10 and components of the controller 10 may be implemented based on instructions of a program code and a processor inside or outside the PMIC 1100 may execute instructions to provide operations of the controller 10 and the components of the controller 10.

The converting block 1110 may receive a voltage Vin. For example, the converting block 1110 may receive the voltage Vin from an electronic circuit, which is positioned inside or outside the PMIC 1100, such as a voltage generator or a voltage regulator. The converting block 1110 may receive a signal S1 from the controlling block 1140. For example, the voltage Vin may be a reference voltage that is generated in consideration of a characteristic of a process/voltage/temperature (PVT) variation.

The converting block 1110 may generate the voltage Vout and a current Iout based on the voltage Vin and the signal S1. For example, the converting block 1110 may adjust a level of the voltage Vout based on the signal S1. The converting block 1110 may convert the voltage Vin to generate the voltage Vout having the level adjusted based on the signal S1. The converting block 1110 may output the voltage Vout to the calculating block 1120. The converting block 1110 may output the current Iout corresponding to the voltage Vout to the calculating block 1120. The converting block 1110 may output the voltage Vout to the SoC 1200b.

For better understanding, the converting block 1110 included in the PMIC 1100 is illustrated in FIG. 4, but it may be understood that the converting block 1110 is positioned in any space. For example, the converting block 1110 may be included in the SoC 1200 of FIG. 1. Alternatively, the converting block 1110 may be included in a component that is separate from the PMIC 1100 and the SoC 1200.

For better understanding, an example is illustrated in FIG. 4 in which the voltage Vout and the current Iout are respectively output through separated paths, but it may be understood that the current Iout corresponding to the voltage Vout is transferred as the voltage Vout is transferred. Accordingly, it may be understood that a level of the voltage Vout and a level of the current Iout have values determined based on physical laws.

As described with reference to FIG. 3, for example, the voltage Vout may include voltages Vout1 to Vout3, and the current Iout may include currents Iout1 to Iout3 respectively corresponding to the voltages Vout1 to Vout3. The converting block 1110 may output the voltages Vout1 to Vout3 and the currents Iout1 to Iout3 to the calculating block 1120. The converting block 1110 may respectively output the voltages Vout1 to Vout3 to the cores 1251 to 1253 of FIG. 3.

The calculating block 1120 may receive the voltage Vout and the current Iout from the converting block 1110. The calculating block 1120 may receive a signal S2 from the controlling block 1140. The calculating block 1120 may calculate powers "Pi" (e.g., "i"=1, 2, and 3, in the example of FIG. 3) to be provided to the SoC 1200 based on the voltage Vout and the current Iout. The calculating block 1120 may calculate sums of the calculated powers "Pi", based on the signal S2. The calculating block 1120 may output a signal Pout indicating the calculated values to the comparing block 1130.

For example, the calculating block 1120 may calculate power "P1" to be provided to the big core 1251, based on the voltage Vout1 and the current Iout1; may calculate power "P2" to be provided to the medium core 1252, based on the voltage Vout2 and the current Iout2; and may calculate power "P3" to be provided to the little core 1253, based on the voltage Vout3 and the current Iout3. In response to the signal S2 of the controlling block 1140, the calculating block 1120 may calculate "P1+P2", "P1+P3", "P2+P3", and "P1+P2+P3" based on the calculated powers "P1" to "P3".

In response to the signal S2 of the controlling block 1140, the calculating block 1120 may output signals Pout1 to Pout3 respectively indicating three different sets of "P1", "P2", "P3", "P1+P2", "P1+P3", "P2+P3", and "P1+P2+P3". A description is given in which the calculating block 1120 may calculate all the sums of "P1+P2", "P1+P3", "P2+P3", and "P1+P2+P3", but the calculating block 1120 may be configured to calculate only a part of "P1+P2", "P1+P3", "P2+P3", and "P1+P2+P3". For example, the calculating block 1120 may be configured to calculate only "P2+P3" and "P1+P2+P3" (refer to FIG. 8).

The comparing block 1130 may receive the signal Pout from the calculating block 1120. The comparing block 1130 may obtain a value (hereinafter referred to as "Pout") indicated by the signal Pout, based on the signal Pout. The comparing block 1130 may receive a signal S3 from the controlling block 1140. The comparing block 1130 may obtain a threshold value based on the signal S3. The comparing block 1130 may compare "Pout" with the threshold value to generate the signal INT for controlling the SoC 1200b. The comparing block 1130 may output the signal INT to the SoC 1200b.

For example, the comparing block 1130 may obtain a value (hereinafter referred to as "Pout1") indicated by the signal Pout1, may obtain a value (hereinafter referred to as "Pout2") indicated by the signal Pout2, and may obtain a value (hereinafter referred to as "Pout3") indicated by the signal Pout3. The comparing block 1130 may compare "Pout1" with a threshold value "Pth1" corresponding to the signal Pout1 to output the signal INT1, may compare "Pout2" with a threshold value "Pth2" corresponding to the signal Pout2 to output the signal INT2, and may compare "Pout3" with a threshold value "Pth3" corresponding to the signal Pout3 to output the signal INT3.

The threshold values "Pth1", "Pth2", and "Pth3" may be associated with the available powers of the cores 1251 to 1253. The example threshold values "Pth1", "Pth2", and "Pth3" that are determined by the controlling block 1140 will be more fully described with reference to FIGS. 9 and 13. The comparing block 1130 may output the signals INT1 to INT3 to the DVFS controller 1210_2.

The controlling block 1140 may receive the signal CMD from the SoC 1200b. The controlling block 1140 may determine a level of the voltage Vout based on the signal CMD. As described with reference to FIGS. 2 and 3, the DVFS controller 1210_2 may request the voltage Vout having a specific level from the PMIC 1100 and the controlling block 1140 may determine a level of the voltage Vout as the requested level based on the signal CMD. The controlling block 1140 may control the converting block 1110 for the purpose of adjusting the level of the voltage Vout being output from the converting block 1110 to the determined level. The controlling block 1140 may output, to the converting block 1110, the signal S1 for controlling the converting block 1110.

The controlling block 1140 may obtain values "Pi" corresponding to powers to be supplied to the cores 1251 to 1253 from the calculating block 1120. For example, "P1" may correspond to power to be provided to the big core 1251, "P2" may correspond to power to be provided to the medium core 1252, and "P3" may correspond to power to be provided to the little core 1253.

The controlling block 1140 may compare "P1" to "P3" and the available powers "Pmax1" to "Pmax3" of the cores 1251 to 1253 to generate comparison results. The controlling block 1140 may control the calculating block 1120 and the comparing block 1130 based on the comparison results. Example operations of the controlling block 1140 for distributing allowable powers of the cores 1251 to 1253 based on the comparison results will be more fully described with reference to FIGS. 6, 9, and 13.

In the specification, an "allowable power" means a value that is determined based on an available power of a specific component and power to be provided to the specific component. In detail, when the power to be provided to the specific component is less than the available power of the specific component, the allowable power means a value that is obtained by subtracting the power to be provided to the specific component from the available power of the specific component. Accordingly, the expression "a specific component has an allowable power" means that "a power to be provided to the specific component is less than an available power of the specific component".

Figure 5:
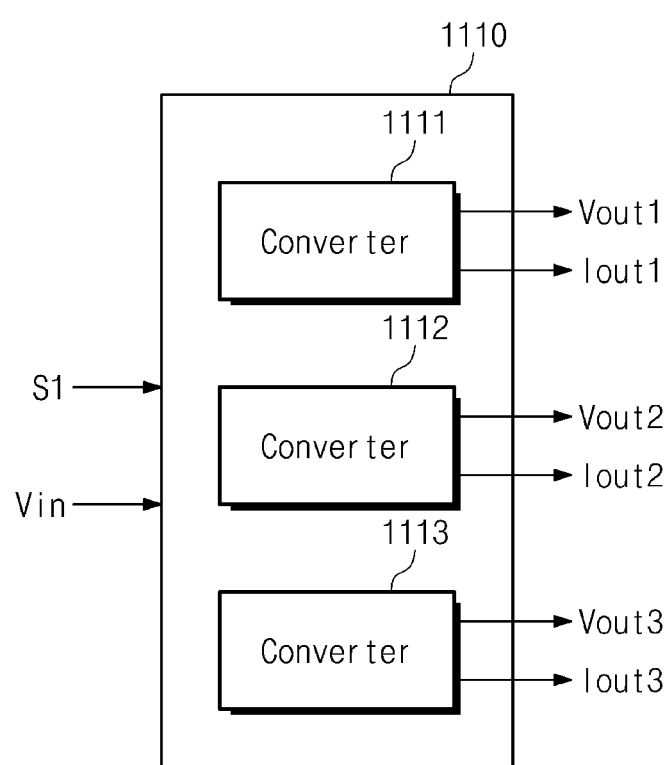
FIG. 5 is a block diagram illustrating an example configuration of a converting block of FIG. 4.

FIG. 5 is a block diagram illustrating an example configuration of a converting block of FIG. 4.

Referring to FIG. 5, the converting block 1110 may include converters 1111 to 1113. As described with reference to FIG. 4, the converting block 1110 may receive the voltage Vin from an electronic circuit such as a voltage generator or a voltage regulator. The converting block 1110 may receive the signal S1 from the controlling block 1140.

The converter 1111 may convert the voltage Vin to generate the voltage Vout1 having a level determined by the signal S1. The converter 1111 may output the voltage Vout1 and the current Iout1 corresponding to the voltage Vout1 to the calculating block 1120. The converter 1111 may output the voltage Vout1 to the big core 1251 of the SoC 1200b.

The converter 1112 may convert the voltage Vin to generate the voltage Vout2 having a level determined by the signal S1. The converter 1112 may output the voltage Vout2 and the current Iout2 corresponding to the voltage Vout2 to the calculating block 1120. The converter 1112 may output the voltage Vout2 to the medium core 1252 of the SoC 1200b.

The converter 1113 may convert the voltage Vin to generate the voltage Vout3 having a level determined by the signal S1. The converter 1113 may output the voltage Vout3 and the current Iout3 corresponding to the voltage Vout3 to the calculating block 1120. The converter 1113 may output the voltage Vout3 to the little core 1253 of the SoC 1200b.

For better understanding, an example is illustrated in FIG. 5 in which the voltages Vout1 to Vout3 and the currents Iout1 to Iout3 are respectively output as separate signals, but it may be understood that the voltages Vout1 to Vout3 respectively corresponding to the currents Iout1 to Iout3 may be transferred as the currents Iout1 to Iout3 are transferred. For example, both a voltage (Vout, Vout2, Vout3) and its corresponding current (Iout1, Iout2, Iout3) may be communicated by a single signal.

Figure 6:
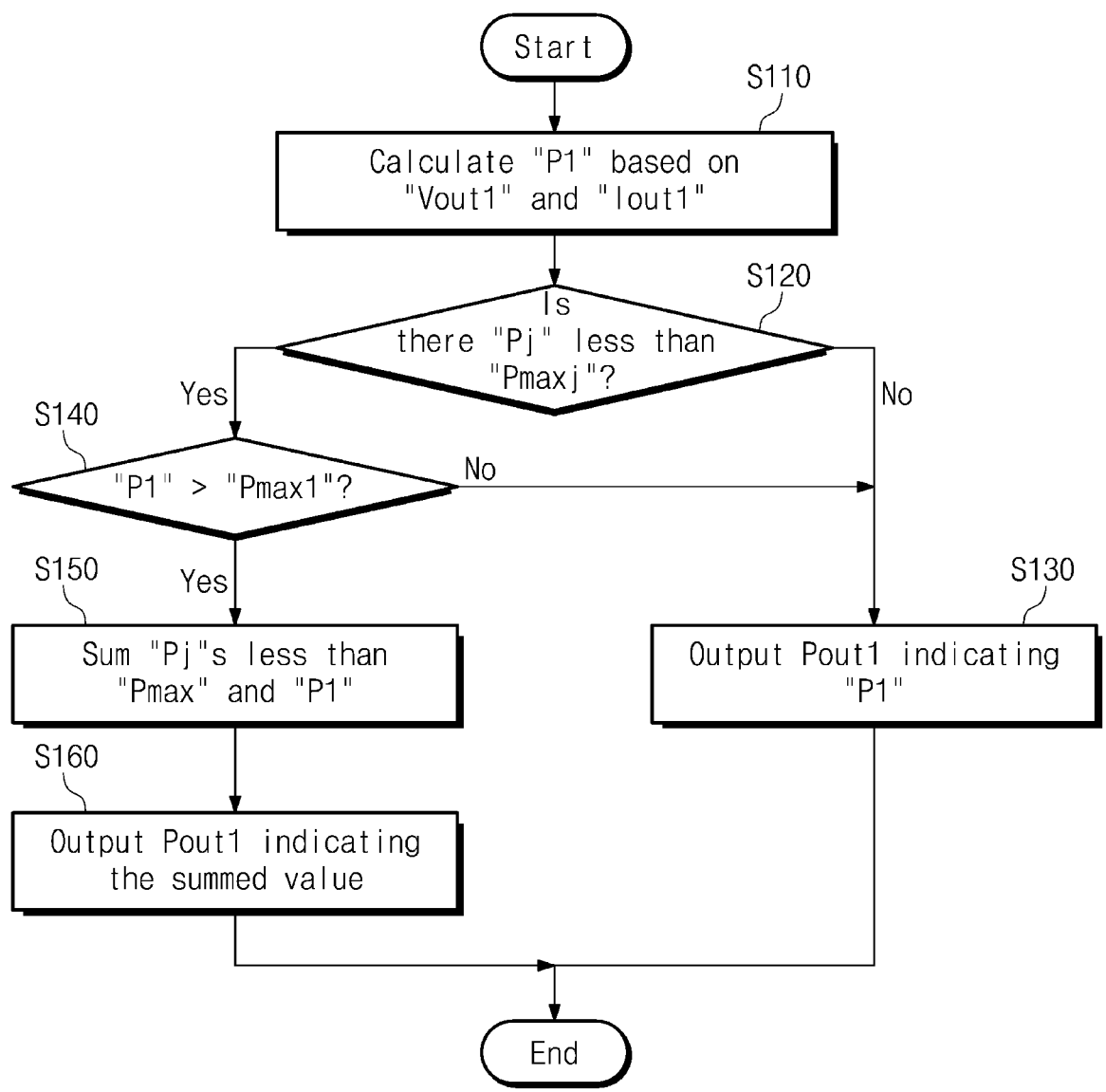
FIG. 6 is a flowchart illustrating example operations of a controlling block and a calculating block of FIG. 4.

FIG. 6 is a flowchart illustrating example operations of a controlling block and a calculating block of FIG. 4.

Example operations of the calculating block 1120 for outputting the signal Pout1 based on the voltage Vout1 and the current Iout1 output from the converter 1111 will be described with reference to FIG. 6. Example operations of the calculating block 1120 for outputting the signal Pout2 and example operations of the calculating block 1120 for outputting the signal Pout3 are similar to example operations to be described with reference to FIG. 6, and thus, additional description will be omitted to avoid redundancy.

In operation S110, the calculating block 1120 may calculate "P1" based on the voltage Vout1 and the current Iout1. For example, the calculating block 1120 may determine a value, which is obtained by multiplying a magnitude of the voltage Vout1 and a magnitude of the current Iout1 together, as "P1". Because the voltage Vout1 and the current Iout1 are a voltage and a current to be provided to the big core 1251, "P1" may correspond to power to be provided to the big core 1251.

In operation S120, the controlling block 1140 may determine whether "Pj" is less than an available power "Pmaxj" (in the case of the example of FIG. 3, J=2 and 3). The controlling block 1140 may output the signal S2 based on a determination result to control the calculating block 1120. Under control of the controlling block 1140, operation S130 or operation S140 may be performed by the calculating block 1120. When "Pj" is less than "Pmaxj", operation S140 may be performed by the calculating block 1120. When "Pj" is not less than "Pmaxj", operation S130 may be performed by the calculating block 1120.

In operation S130, the calculating block 1120 may output the signal Pout1 indicating "P1" to the comparing block 1130. Afterwards, the operation of FIG. 6 may be terminated.

In operation S140, the controlling block 1140 may determine whether power "P1" to be supplied to the big core 1251 exceeds the available power "Pmax1" of the big core 1251. The controlling block 1140 may output the signal S2 for controlling the calculating block 1120 based on a determination result. The calculating block 1120 may perform operation S130 or operation S150 in response to the signal S2.

When "P1" exceeds "Pmax1", operation S150 and operation S160 may be performed for the purpose of continuously supplying the power "P1" greater than "Pmax1" to the big core 1251 (i.e., such that the signal INT1 for the big core 1251 is not output). When "P1" does not exceed "Pmax1", operation S130 may be performed.

In operation S150, the calculating block 1120 may calculate a sum of power "P1" and powers "Pj" less than "Pmaxj". For example, when "P2" is less than "Pmax2" and "P3" is not less than "Pmax3" (when only the medium core 1252 has an allowable power), the calculating block 1120 may calculate "P1+P2". For example, when "P2" is not less than "Pmax2" and "P3" is less than "Pmax3" (when only the little core 1253 has an allowable power), the calculating block 1120 may calculate "P1+P3". For example, when "P2" is less than "Pmax2" and "P3" is less than "Pmax3" (when both the medium core 1252 and the little core 1253 have an allowable power), the calculating block 1120 may calculate "P1+P2+P3".

In operation S160, the calculating block 1120 may output the signal Pout1 indicating the value (one of "P1+P2", "P1+P3", and "P1+P2+P3") calculated in operation S150 to the comparing block 1130. Afterwards, the operation of the calculating block 1120 may be terminated.

An embodiment in which operation S120 and operation S140 are sequentially performed is described with reference to FIG. 6, but it may be understood that operation S120 and operation S140 may be performed in any order. For example, after operation S140 and operation S120 are sequentially performed, operation S150 may be performed. For example, after operation S140 and operation S120 are sequentially performed, operation S130 may be performed.

Figure 7:
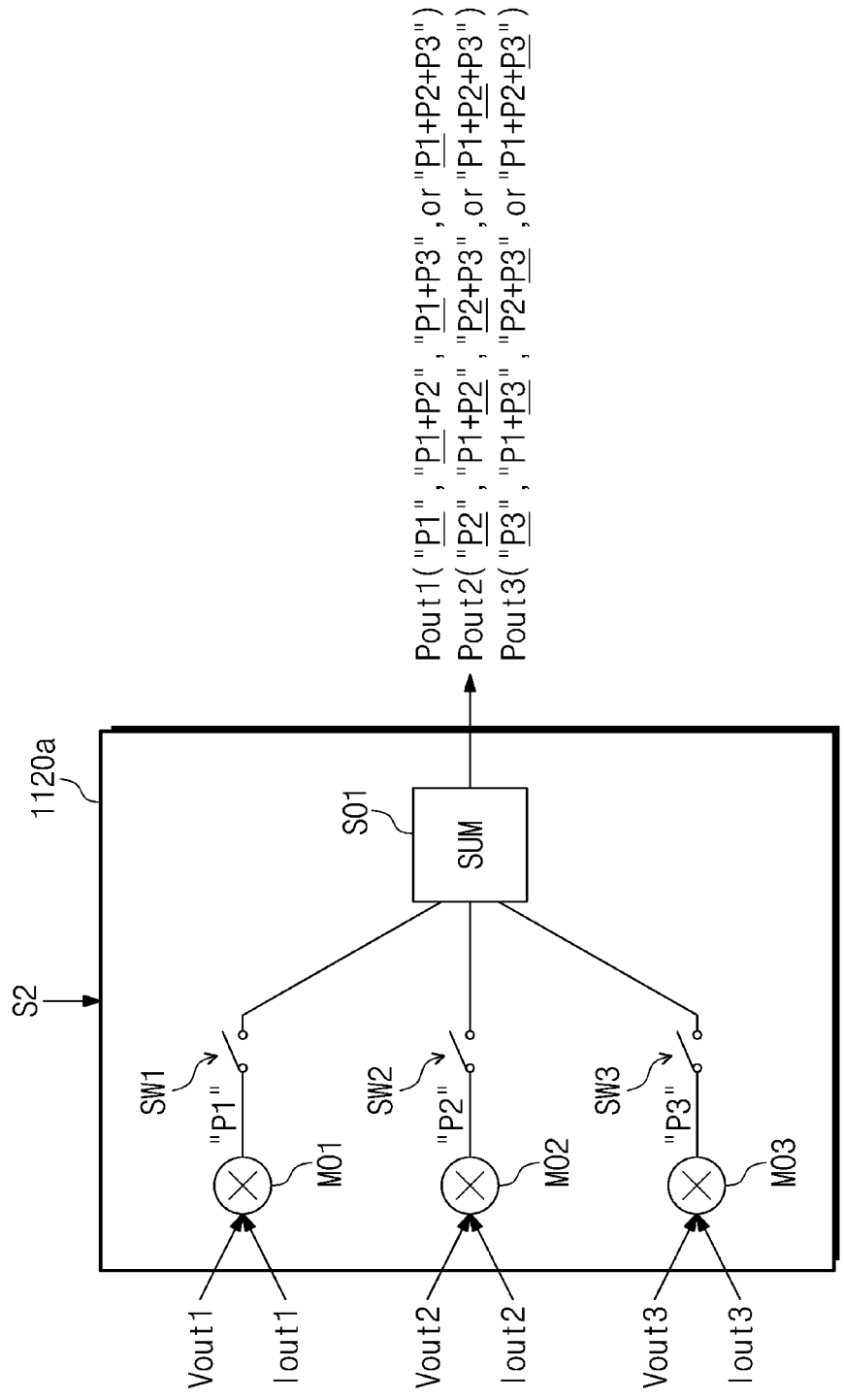
FIG. 7 is a circuit diagram illustrating an example configuration of a calculating block configured to perform operations of FIG. 6.

FIG. 7 is a circuit diagram illustrating an example configuration of a calculating block configured to perform operations of FIG. 6.

The calculating block 1120 of FIG. 4 may include a calculating block 1120a of FIG. 7. Referring to FIG. 7, the calculating block 1120a may include multipliers MO1 to MO3, switches SW1 to SW3, and a summer S01. The calculating block 1120a may receive the signal S2 from the controlling block 1140. For example, the switches SW1 to SW3 may be implemented with one or more multiplexers (MUX) operating in response to the signal S2.

An operation corresponding to operation S110 of FIG. 6 may be performed by the calculating block 1120a.

The multiplier MO1 may receive the voltage Vout1 and the current Iout1 from the converter 1111 of FIG. 5. The multiplier MO1 may obtain the value "P1", which is obtained by multiplying a level of the voltage Vout1 and a level of the current Iout1 together, based on the voltage Vout1 and the current Iout1. "P1" may correspond to power to be provided to the big core 1251.

The multiplier MO2 may receive the voltage Vout2 and the current Iout2 from the converter 1112 of FIG. 5. The multiplier MO2 may obtain the value "P2", which is obtained by multiplying a level of the voltage Vout2 and a level of the current Iout2 together, based on the voltage Vout2 and the current Iout2. "P2" may correspond to power to be provided to the medium core 1252.

The multiplier MO3 may receive the voltage Vout3 and the current Iout3 from the converter 1113 of FIG. 5. The multiplier MO3 may obtain the value "P3", which is obtained by multiplying a level of the voltage Vout3 and a level of the current Iout3 together, based on the voltage Vout3 and the current Iout3. "P3" may correspond to power to be provided to the little core 1253.

Operations corresponding to operation S120 and operation S140 of FIG. 6 may be performed by the controlling block 1140 and the calculating block 1120a.

The controlling block 1140 may obtain results of comparing "P1" and "Pmax1", comparing "P2" and "Pmax2", and comparing "P3" and "Pmax3". The controlling block 1140 may output the signal S2 for controlling the switches SW1 to SW3 of the calculating block 1120a based on the obtained comparison results. The switches SW1 to SW3 of the calculating block 1120a may operate based on the signal S2.

An operation corresponding to operation S130 of FIG. 6 may be performed by the calculating block 1120a. To output the signal Pout1 corresponding to the big core 1251, the switch SW1 may connect the multiplier MO1 and the summer S01 in response to the signal S2. "P1" may be provided to the summer SO1 through the switch SW1. Accordingly, "Pout1" indicated by the signal Pout1 may include "P1".

For example, "P2" is not less than "Pmax2", and "P3" may be not less than "Pmax3". Alternatively, "P1" may be less than "Pmax1". The switch SW2 may disconnect the multiplier MO2 from the summer SO1 in response to the signal S2. The switch SW3 may disconnect the multiplier MO3 from the summer SO1 in response to the signal S2. The summer SO1 may output the signal Pout1 indicating "P1" to the comparing block 1130.

Operations corresponding to operation S150 and operation S160 of FIG. 6 may be performed by the calculating block 1120a.

For example, "P1" may be greater than "Pmax1", "P2" may be less than "Pmax2", and "P3" may be less than "Pmax3" (corresponding to the case where both the medium core 1252 and the little core 1253 have an allowable power). The switch SW2 may connect the multiplier MO2 and the summer SO1 in response to the signal S2. Accordingly, "P2" may be provided to the summer SO1 through the switch SW2. The switch SW3 may connect the multiplier MO3 and the summer SO1 in response to the signal S2. Accordingly, "P3" may be provided to the summer SO1 through the switch SW3.

The summer SO1 may calculate a sum of "P1" to "P3" that are provided from the multipliers MO1 to MO3. The summer SO1 may output the signal Pout1 indicating "P1+P2+P3" being a sum of "P1" to "P3" to the comparing block 1130.

For example, "P1" may be greater than "Pmax1", "P2" may be not less than "Pmax2", and "P3" may be less than "Pmax3" (corresponding to the case where only the little core 1253 has an allowable power). The switch SW2 may disconnect the multiplier MO2 from the summer SO1 in response to the signal S2. The switch SW3 may connect the multiplier MO3 and the summer SO1 in response to the signal S2. Accordingly, "P3" may be provided to the summer SO1 through the switch SW3.

The summer SO1 may calculate a sum of "P1" and "P3" that are provided from the multipliers MO1 and MO3. The summer SO1 may output the signal Pout1 indicating "P1+P3" being a sum of "P1" and "P3" to the comparing block 1130.

For example, "P1" may be greater than "Pmax1", "P2" may be less than "Pmax2", and "P3" may be not less than "Pmax3" (corresponding to the case where only the medium core 1252 has an allowable power). The switch SW2 may connect the multiplier MO2 and the summer SO1 in response to the signal S2. Accordingly, "P2" may be provided to the summer SO1 through the switch SW2. The switch SW3 may disconnect the multiplier MO3 from the summer SO1 in response to the signal S2.

The summer SO1 may calculate a sum of "P1" and "P2" that are provided from the multipliers MO1 and MO2. The summer SO1 may output the signal Pout1 indicating "P1+P2" being a sum of "P1" and "P2" to the comparing block 1130.

The signals Pout2 and Pout3 may be output to the comparing block 1130 by the calculating block 1120 including a configuration similar to the configuration of the calculating block 1120a of FIG. 7, and thus, additional description will be omitted to avoid redundancy. For example, the signal Pout2 may indicate one of "P2", "P1+P2", "P2+P3", and "P1+P2+P3" (including "P2"). For example, the signal Pout3 may indicate one of "P3", "P1+P3", "P2+P3", and "P1+P2+P3" (including "P3").

Figure 8:
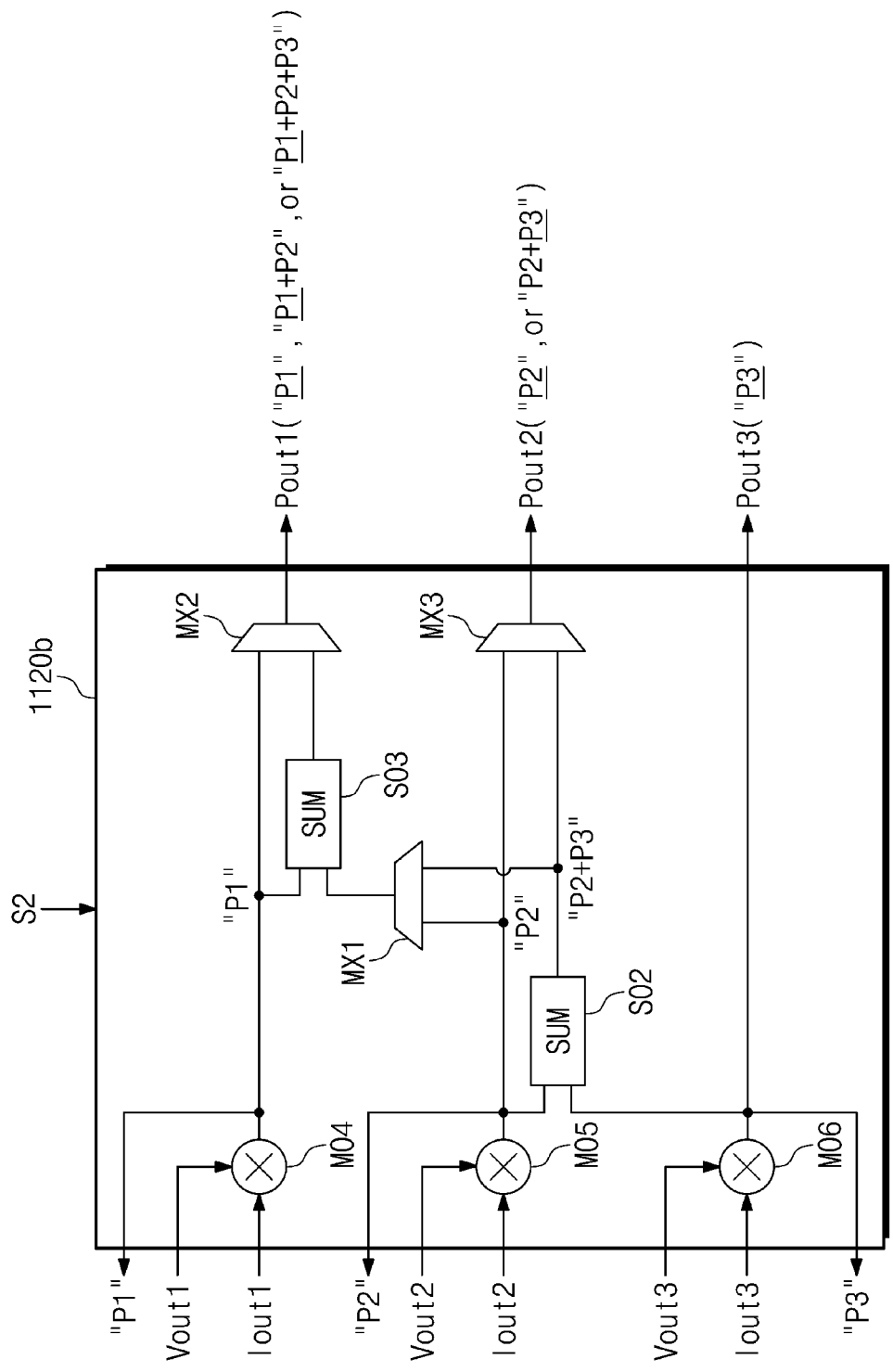
FIG. 8 is a circuit diagram illustrating an example configuration of a calculating block of FIG. 4.

FIG. 8 is a circuit diagram illustrating an example configuration of a calculating block of FIG. 4.

The calculating block 1120 of FIG. 4 may include a calculating block 1120b of FIG. 8. Referring to FIG. 8, the calculating block 1120b may include multipliers MO4 to MO6, summers SO2 and SO3, and multiplexers MX1 to MX3. The calculating block 1120b may receive the signal S2 from the controlling block 1140.

An operation corresponding to operation S110 of FIG. 6 may be performed by the calculating block 1120b. For example, operation S110 of FIG. 6 may be performed by the multipliers MO4 to MO6. Operations of the multipliers MO4 to MO6 of FIG. 8 are similar to the operations of the multipliers MO1 to MO3 described with reference to FIG. 7, and thus, additional description will be omitted to avoid redundancy.

Operations corresponding to operation S120 and operation S140 of FIG. 6 may be performed by the controlling block 1140 and the calculating block 1120b.

The controlling block 1140 may obtain results of comparing "P1" and "Pmax1", comparing "P2" and "Pmax2", and comparing "P3" and "Pmax3". The controlling block 1140 may output the signal S2 for controlling the multiplexers MX1 to MX3 of the calculating block 1120a based on the obtained comparison results. The multiplexers MX1 to MX3 of the calculating block 1120a may operate based on the signal S2.

An operation corresponding to operation S130 of FIG. 6 may be performed by the calculating block 1120b.

For example, "P2" is not less than "Pmax2", and "P3" may be not less than "Pmax3". Alternatively, "P1" may be less than "Pmax1". The multiplexer MX2 may output the signal Pout1 indicating "P1" provided from the multiplier MO4 in response to the signal S2. The multiplexer MX3 may output the signal Pout2 indicating "P2" provided from the multiplier MO5 in response to the signal S2. The signal Pout3 indicating "P3" provided from the multiplier MO6 may be output. The calculating block 1120b may output the signal Pout1 indicating "P1", the signal Pout2 indicating "P2", and the signal Pout3 indicating "P3" to the comparing block 1130.

Operations corresponding to operation S150 and operation S160 of FIG. 6 may be performed by the calculating block 1120b.

For example, "P1" may be greater than "Pmax1", "P2" may be less than "Pmax2", and "P3" may be less than "Pmax3". The summer SO2 may calculate a sum of "P2" and "P3" that are provided from the multipliers MO5 and MO6. The summer SO2 may output "P2+P3" being a sum of "P2" and "P3" to the multiplexers MX1 and MX3.

The multiplexer MX1 may output "P2+P3" provided from the summer SO2 to the summer SO3 in response to the signal S2. The summer SO3 may calculate a sum of "P2+P3" provided from the multiplexer MX1 and "P1" provided from the multiplier MO4. The summer SO3 may output "P1+P2+P3" being a sum of "P2+P3" and "P1" to the multiplexer MX2.

The multiplexer MX2 may output the signal Pout1 indicating "P1+P2+P3" provided from the summer SO3 to the comparing block 1130 in response to the signal S2. The multiplexer MX3 may output the signal Pout2 indicating "P2" provided from the multiplier MO5 to the comparing block 1130 in response to the signal S2. The signal Pout3 indicating "P3" provided from the multiplier MO6 may be output to the comparing block 1130.

For example, "P1" may be not less than "Pmax1", "P2" may be greater than "Pmax2", and "P3" may be less than "Pmax3". The summer SO2 may calculate a sum of "P2" and "P3" that are provided from the multipliers MO5 and MO6. The summer SO2 may output "P2+P3" being a sum of "P2+P3" to the multiplexer MX3.

The multiplexer MX2 may output the signal Pout1 indicating "P1" provided from the multiplier MO4 to the comparing block 1130 in response to the signal S2. The multiplexer MX3 may output the signal Pout2 indicating "P2+P3" provided from the summer SO3 to the comparing block 1130 in response to the signal S2. The signal Pout3 indicating "P3" provided from the multiplier MO6 may be output to the comparing block 1130.

Figure 9:
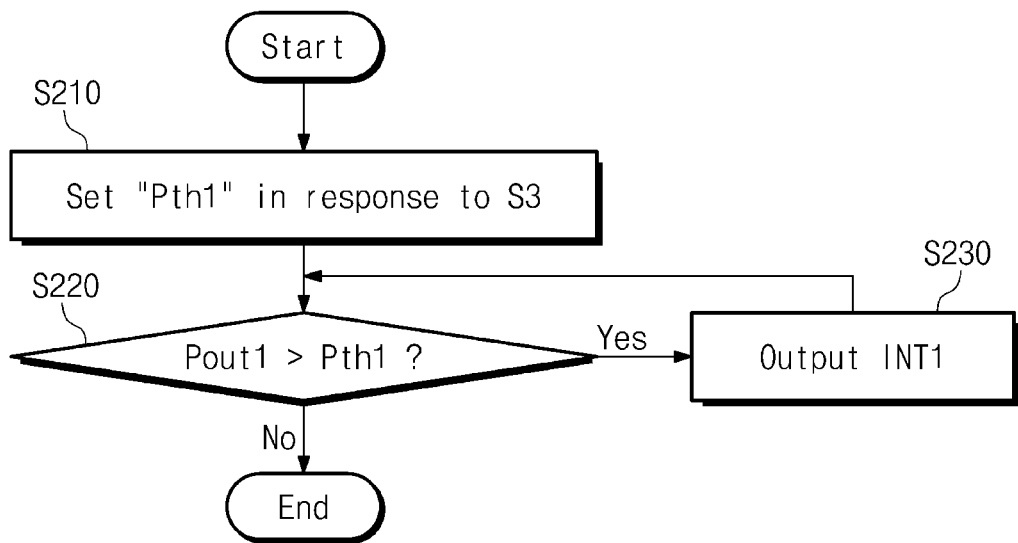
FIG. 9 is a flowchart illustrating example operations of a controlling block and a calculating block of FIG. 4.

FIG. 9 is a flowchart illustrating example operations of a controlling block and a calculating block of FIG. 4.

Example operations of the comparing block 1130 for outputting the signal INT1 will be described with reference to FIG. 9. Example operations of the comparing block 1130 for outputting the signal INT2 and example operations of the comparing block 1130 for outputting the signal INT3 are similar to example operations to be described with reference to FIG. 9, and thus, additional description will be omitted to avoid redundancy. Operations of FIG. 9 may be performed after operation S120 or operation S140 of FIG. 6.

In operation S210, the controlling block 1140 may determine a threshold value "Pth1" corresponding to the signal Pout1. The comparing block 1130 may set the threshold value "Pth1" corresponding to the signal Pout1 in response to the signal S3.

For example, operation S210 may be performed at the same time with operation S130 and/or before/after operation S130. When "P1" is less than "Pmax1" (when the big core 1251 has an allowable power), operation S210 may be performed. Alternatively, when "P2" and "P3" are "Pmax2" and "Pmax3", respectively (when both the medium core 1252 and the little core 1253 do not have an available power), operation S210 may be performed.

In this case, the calculating block 1120 may output the signal Pout1 indicating "P1". The controlling block 1140 may determine the threshold value "Pth1" as the available power "Pmax1" of the big core 1251. In response to the signal S3, the comparing block 1130 may set the threshold value "Pth1" to "Pmax1".

For example, operation S210 may be performed at the same time with operation S150 and operation S160, before operation S150, after operation S160, and/or between operation S150 and operation S160. The comparing block 1130 may set a sum of the allowable power "Pmax1" and the allowable power "Pmax2" and/or "Pmax3" to the threshold value "Pth1" with regard to the signal Pout2 and/or Pout3 corresponding to a core having an allowable power among the medium core 1252 and the little core 1253.

As described with reference to FIG. 6, when "P1" is greater than "Pmax1", "P2" is less than "Pmax2", and "P3" is not less than "Pmax3" (when only the medium core 1252 has an allowable power), the calculating block 1120 may output the signal Pout1 indicating "P1+P2".

In this case, in operation S210, the controlling block 1140 may determine the threshold value "Pth1" as "Pmax1+Pmax2" being a sum of the allowable power "Pmax1" of the big core 1251 and the allowable power "Pmax2" of the medium core 1252 such that an allowable power of the medium core 1252 may be provided to the big core 1251. In response to the signal S3, the comparing block 1130 may set the threshold value "Pth1" to "Pmax1+Pmax2".

As described with reference to FIG. 6, when "P1" is greater than "Pmax1", "P2" is "Pmax2", and "P3" is less than "Pmax3" (when only the little core 1253 has an allowable power), the calculating block 1120 may output the signal Pout1 indicating "P1+P3".

In this case, in operation S210, the controlling block 1140 may determine the threshold value "Pth1" as "Pmax1+Pmax3" being a sum of the allowable power "Pmax1" of the big core 1251 and the allowable power "Pmax3" of the little core 1253 such that an allowable power of the little core 1253 may be provided to the big core 1251. In response to the signal S3, the comparing block 1130 may set the threshold value "Pth1" to "Pmax1+Pmax3".

As described with reference to FIG. 6, when "P1" is greater than "Pmax1", "P2" is less than "Pmax2", and "P3" is less than "Pmax3" (when the medium core 1252 and the little core 1253 have an allowable power), the calculating block 1120 may output the signal Pout1 indicating "P1+P2+P3".

In this case, in operation S210, the controlling block 1140 may determine the threshold value "Pth1" as "Pmax1+Pmax2+Pmax3" being a sum of the allowable power "Pmax1" of the big core 1251, the allowable power "Pmax2" of the medium core 1252, and the allowable power "Pmax3" of the little core 1253 such that allowable powers of the medium core 1252 and the little core 1253 may be provided to the big core 1251. In response to the signal S3, the comparing block 1130 may set the threshold value "Pth1" to "Pmax1+Pmax2+Pmax3".

In operation S220, the comparing block 1130 may compare "Pout1" and the threshold value "Pth1" set in operation S210. When "Pout1" is greater than "Pth1", operation S230 may be performed. When "Pout1" is not greater than "Pth1", the operation of the comparing block 1130 may be terminated.

In operation S230, the comparing block 1130 may output the signal INT1 to the big core 1251. Afterwards, operation S220 may again be performed. For example, through various control operations of the DVFS controller 1210_2 performed in response to the signal INT1, power consumption of the big core 1251 may decrease. Accordingly, "P1" that is calculated by the calculating block 1120 may decrease, and thus, "Pout1" may decrease. When "Pout1" decreases to the threshold value "Pth1" or less, the operation of FIG. 9 may be terminated after operation S220 is performed.

Figure 10:
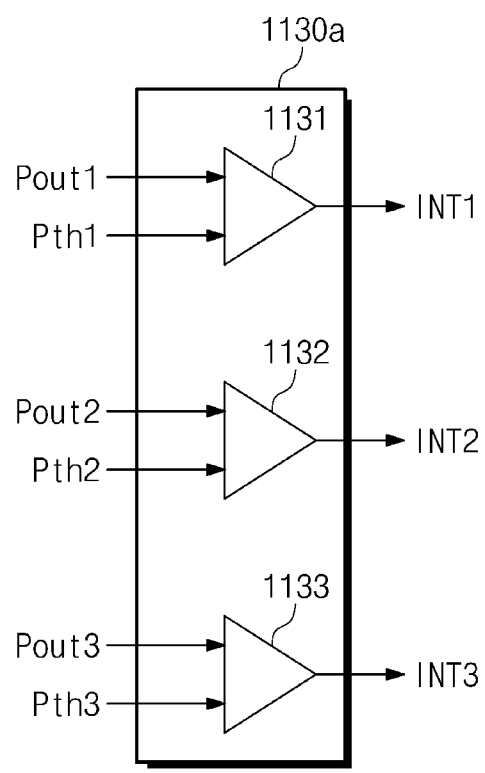
FIG. 10 is a circuit diagram illustrating an example configuration of a comparing block of FIG. 4.

FIG. 10 is a circuit diagram illustrating an example configuration of a comparing block of FIG. 4. The comparing block 1130 of FIG. 4 may include a comparing block 1130a of FIG. 10. The signal Pout of FIG. 4 may include the signals Pout1 to Pout3 of FIG. 10.

Referring to FIG. 10, the comparing block 1130a may include comparators 1131 to 1133. The comparator 1131 may receive the signal Pout1 from the calculating block 1120, the comparator 1132 may receive the signal Pout2 from the calculating block 1120, and the comparator 1133 may receive the signal Pout3 from the calculating block 1120.

As described with reference to FIG. 4, the comparing block 1130a may be implemented with hardware. The controlling block 1140 may control a voltage generator or a voltage regulator positioned inside/outside the PMIC 1100 for the purpose of adjusting levels of threshold values "Pth1", "Pth2", and "Pth3". To this end, the PMIC 1100 may include a register for storing the threshold values "Pth1", "Pth2", and "Pth3". The register may be positioned inside or outside the PMIC 1100.

The controller 10 may store the adjusted threshold values "Pth1", "Pth2", and "Pth3" in the register by executing operation 210 of FIG. 9. The controller 10 may adjust a level of a voltage output from the voltage generator or the voltage regulator based on the stored threshold values "Pth1", "Pth2", and "Pth3". The comparing block 1130a may receive voltages having levels of the threshold values "Pth1", "Pth2", and "Pth3" from the voltage generator or the voltage regulator.

The comparator 1131 may compare "Pout1" indicated by the signal Pout1 and the threshold value "Pth1", and may output the signal INT1 when "Pout1" is greater than "Pth1". The comparator 1132 may compare "Pout2" indicated by the signal Pout2 and the threshold value "Pth2", and may output the signal INT2 when "Pout2" is greater than "Pth2". The comparator 1133 may compare "Pout3" indicated by the signal Pout3 and the threshold value "Pth3", and may output the signal INT3 when "Pout3" is greater than "Pth3" (corresponding to operation S220 and operation S230 of FIG. 9).

Figure 11:
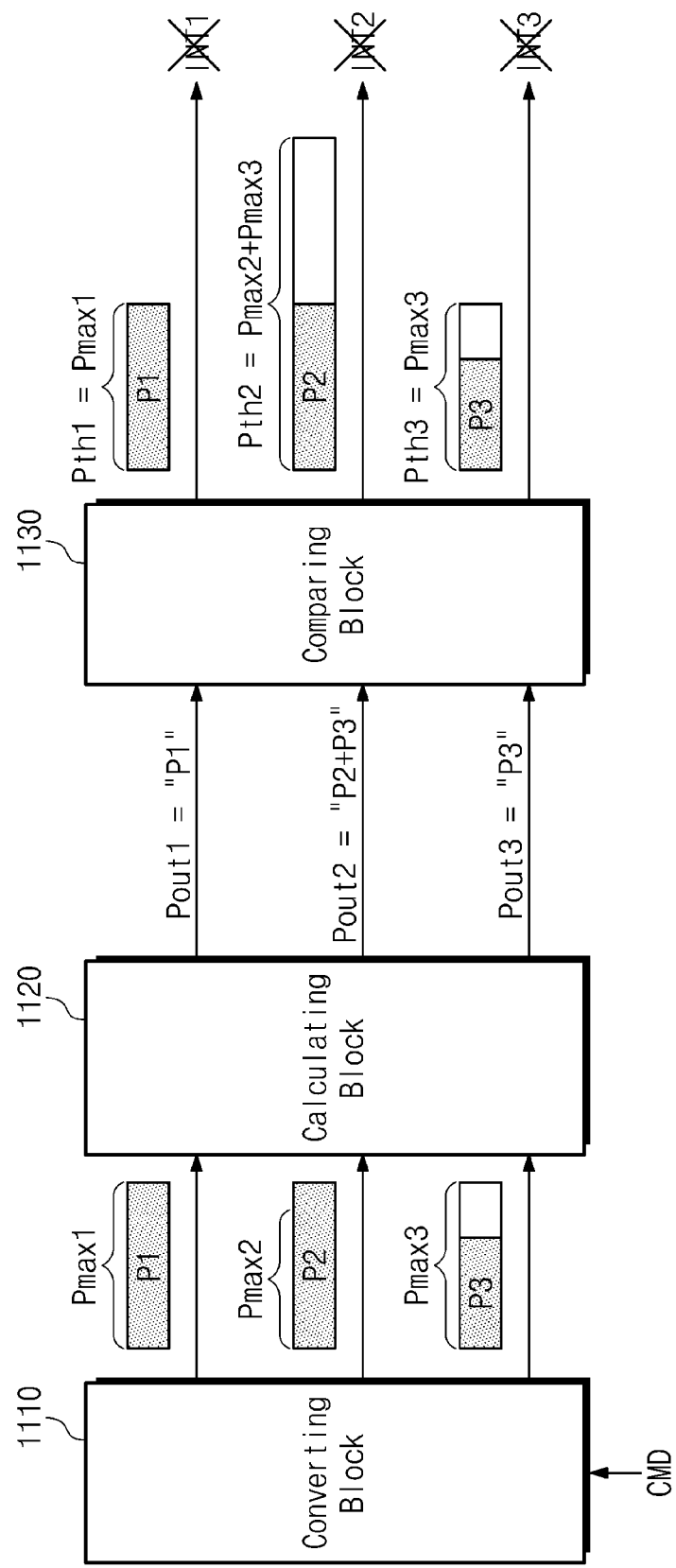
FIG. 11 is a conceptual diagram illustrating an example operation of a PMIC of FIG. 4.

FIG. 11 is a conceptual diagram illustrating an example operation of a PMIC of FIG. 4.

For better understanding, example operations of the PMIC 1100 will be described with reference to FIG. 11. In an example of FIG. 11, power "P1" to be provided from the PMIC 1100 to the big core 1251 may be the available power "Pmax1" of the big core 1251, power "P2" to be provided from the PMIC 1100 to the medium core 1252 may be greater than the available power "Pmax2" of the medium core 1252, power "P3" to be provided from the PMIC 1100 to the little core 1253 may be less than the available power "Pmax3" of the little core 1253. Below, example operations of the PMIC 1100 for distributing an allowable power of the little core 1253 to the medium core 1252 will be described.

The converting block 1110 may provide the power "P1" substantially identical to "Pmax1" by generating the voltage Vout1 and the current Iout1, may provide the power "P2" greater than "Pmax2" by generating the voltage Vout2 and the current Iout2, and may provide the power "P3" less than "Pmax3" by generating the voltage Vout3 and the current Iout3. The voltages Vout1 to Vout3 may have levels that are respectively determined based on the signal CMD.

The calculating block 1120 may output the signal Pout1 indicating "P1" and the signal Pout3 indicating "P3". The calculating block 1120 may output the signal Pout2 indicating "P2+P3" for the purpose of sharing an allowable power "Pmax3–P3" of the little core 1253 with the medium core 1252. That is, the calculating block 1120 may output the signal Pout2 indicating "P2+P3" being a sum of the power "P3" to be provided to the little core 1253 and the power "P2" to be provided to the medium core 1252.

The comparing block 1130 may set the threshold value "Pth1" to the available power "Pmax1" of the big core 1251 and may set the threshold value "Pth3" to the available power "Pmax3" of the little core 1253. To provide an allowable power of the little core 1253 to the medium core 1252, the comparing block 1130 may set "Pmax2+Pmax3" being a sum of the allowable power "Pmax2" of the medium core 1252 and the allowable power "Pmax3" of the little core 1253 to the threshold value "Pth2".

Because "P1" indicated by the signal Pout1 is less than "Pth1", the comparing block 1130 may not output the signal INT1. Because "P2+P3" indicated by the signal Pout2 is less than "Pth2", the comparing block 1130 may not output the signal INT2. Because "P3" indicated by the signal Pout3 is less than "Pth3", the comparing block 1130 may not output the signal INT3.

Because the signal INT2 is not output to the DVFS controller 1210_2 of the SoC 1200b, afterwards, the DVFS controller 1210_2 may continuously request the voltage Vout2 having a current level from the PMIC 1100. As such, power corresponding to "P2" may be continuously supplied to the medium core 1252.

Alternatively, the DVFS controller 1210_2 may request the voltage Vout2 having a greater level than a current level from the PMIC 1100. As such, power greater than "P2" may be supplied to the medium core 1252. However, as described with reference to operation S230 of FIG. 9, in the case where "P2" exceeds "Pmax2+Pmax3", the PMIC 1100 may output the signal INT2. Afterwards, in response to the signal INT2, the DVFS controller 1210_2 may perform various control operations for decreasing power that is consumed by the medium core 1252.

As described with reference to FIG. 11, in the case where the little core 1253 has an allowable power, even though the power "P2" to be provided to the medium core 1252 exceeds the allowable power "Pmax2" but does not exceed "Pmax2+Pmax3", the signal INT2 may not be output. Accordingly, the converting block 1110 may provide power greater than the available power "Pmax2" to the medium core 1252. The medium core 1252 that is provided with the power greater than the available power "Pmax2" may operate with high performance (e.g., based on a high operating frequency).

As in the above description, in the case where any other component of the SoC 1200a except for the medium core 1252 has an allowable power, the medium core 1252 may be provided with power greater than "Pmax2" by distributing the allowable power. Accordingly, the medium core 1252 may operate with high performance.

Figure 12:
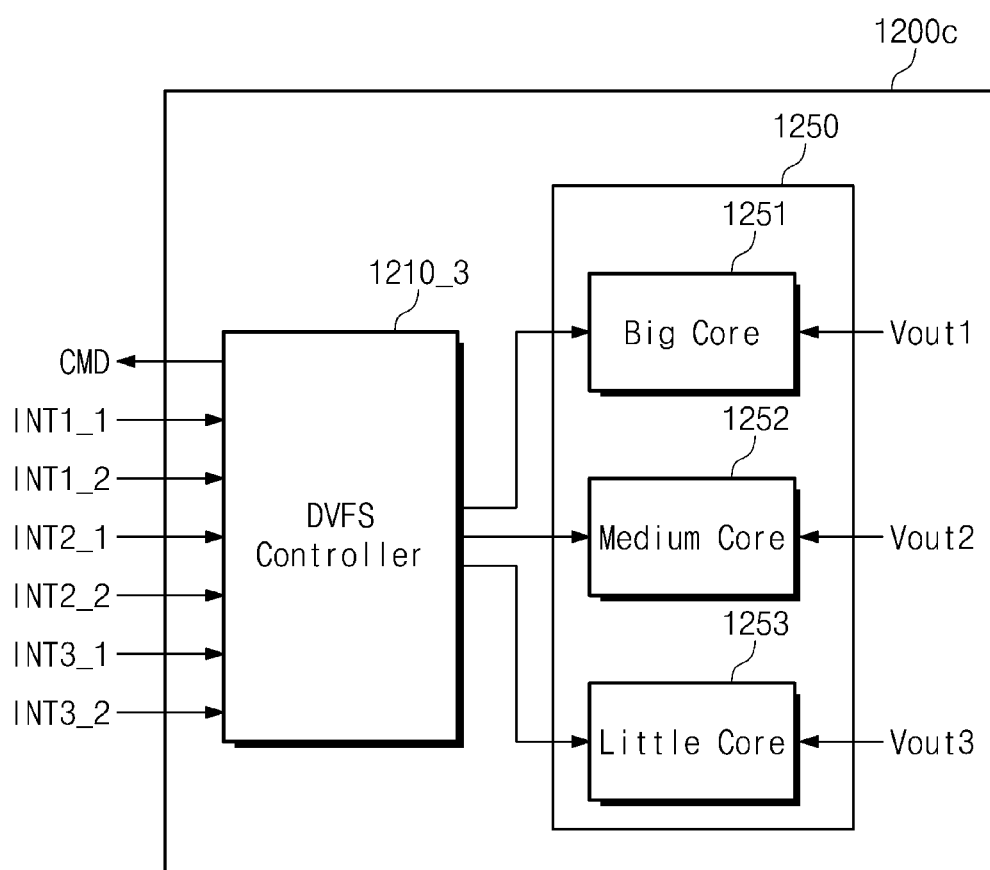
FIG. 12 is a block diagram illustrating an example configuration of an SoC of FIG. 1.

FIG. 12 is a block diagram illustrating an example configuration of an SoC of FIG. 1.

Comparing an SoC 1200c of FIG. 12 and the SoC 1200b of FIG. 3, the SoC 1200c may include a DVFS controller 1210_3 instead of the DVFS controller 1210_2. Signals INT1_1, INT2_1, and INT3_1 of FIG. 12 may correspond to the signals INT1 to INT3 of FIG. 3, respectively. The DVFS controller 1210_3 may receive signals INT1_2, INT2_2, and INT3_2 from the PMIC 1100. Example operations of the PMIC 1100 for outputting the signals INT1_2, INT2_2, and INT3_2 will be more fully described with reference to FIGS. 13 and 14.

As in the description given with reference to FIGS. 2 and 3, the DVFS controller 1210_3 may perform various control operations for limiting powers that are consumed by the cores 1251 to 1253, in response to the signals INT1_1, INT2_1, and INT3_1. Accordingly, powers that are consumed by the cores 1251 to 1253 may decrease.

Afterwards, the DVFS controller 1210_3 may receive the signals INT1_2, INT2_2, and INT3_2. The DVFS controller 1210_3 may stop various control operations for limiting powers that are consumed by the cores 1251 to 1253, in response to the signals INT1_2, INT2_2, and INT3_2. For example, the DVFS controller 1210_3 may stop controlling a clock control unit that has been decreasing operating frequencies of the cores 1251 to 1253.

Figure 13:
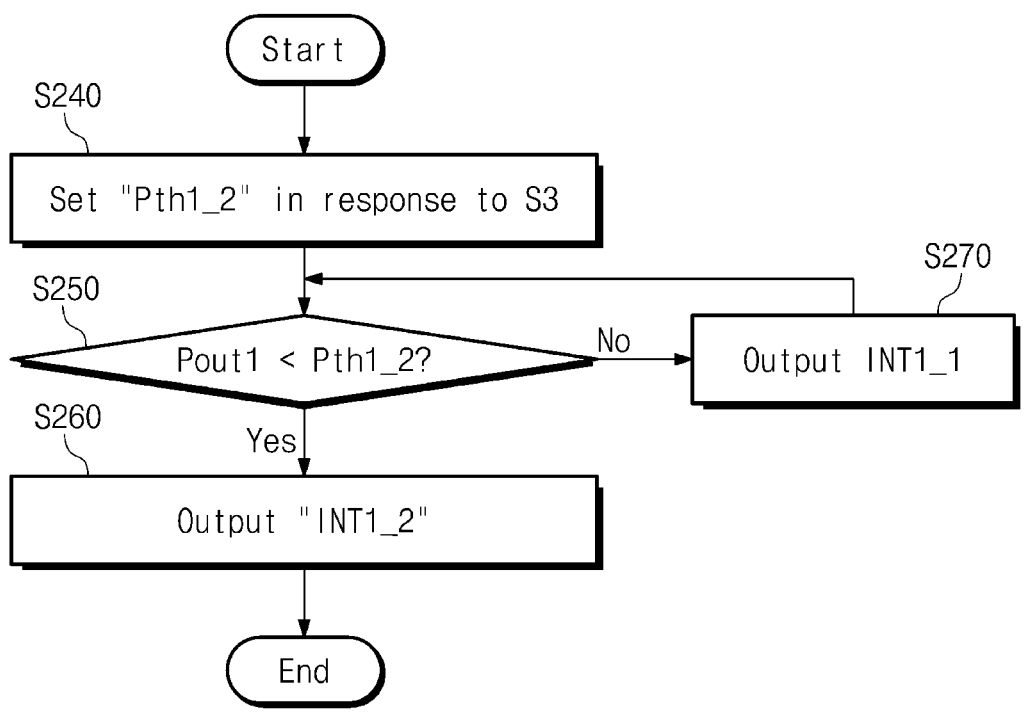
FIG. 13 is a flowchart illustrating example operations of a comparing block and a controlling block of FIG. 4.

FIG. 13 is a flowchart illustrating example operations of a comparing block and a controlling block of FIG. 4. Operations of FIG. 13 may be performed after operation S230 of FIG. 9.

Example operations of the comparing block 1130 for outputting the signal INT1_2 will be described with reference to FIG. 13. Example operations of the comparing block 1130 for outputting signals INT2_2 and INT3_2 are similar to example operations of the comparing block 1130 for outputting the signal INT1_2, and thus, additional description will be omitted to avoid redundancy.

In operation S240, the controlling block 1140 may determine a threshold value "Pth1_2" corresponding to the signal Pout1. In response to the signal S3, the comparing block 1130 may set the threshold value "Pth1_2" to a value determined by the controlling block 1140.

For example, for a stable operation of the PMIC 1100, the controlling block 1140 may determine the threshold value "Pth1_2" to be a value that is smaller than a threshold value "Pth1_1" by as much as a reference value "Pm". For example, the reference value "Pm", which is a value set upon designing the PMIC 1100, may be determined based on an experience of a designer or based on a result of testing the PMIC 1100.

As described with reference to FIG. 9, the threshold value "Pth1_1" may be set to one of "Pmax1", "Pmax1+Pmax2", "Pmax1+Pmax3", and "Pmax1+Pmax2+Pmax3". Accordingly, the threshold value "Pth1_2" may be set to one of "Pmax1−Pm", "Pmax1+Pmax2−Pm", "Pmax1+Pmax3−Pm", and "Pmax1+Pmax2+Pmax3−Pm".

In operation S250, the comparing block 1130 may compare a value "Pout1" indicated by the signal Pout1 with the threshold value "Pth1_2". When "Pout1" is less than "Pth1_2" (i.e., when "Pout1" that is greater than "Pth1_1" decreases to a value less than "Pth1_2"), operation S260 may be performed. When "Pout1" is not less than "Pth1_2", operation S270 may be performed.

In operation S260, the comparing block 1130 may output the signal INT1_2 to the DVFS controller 1210_3. In response to the signal INT1_2, the DVFS controller 1210_3 may stop a control operation for limiting power that is consumed by the big core 1251.

In operation S270, the comparing block 1130 may output the signal INT1_1 to the DVFS controller 1210_3. For example, through the control operation of the DVFS controller 1210_3 performed in response to the signal INT1_1, power consumption of the big core 1251 may decrease. Accordingly, "P1" that is calculated by the calculating block 1120 may decrease, and thus, "Pout1" may decrease. When "Pout1" decreases to the threshold value "Pth1_2" or less, the operation of FIG. 13 may be terminated after operation S250 and operation S260 are performed.

Figure 14:
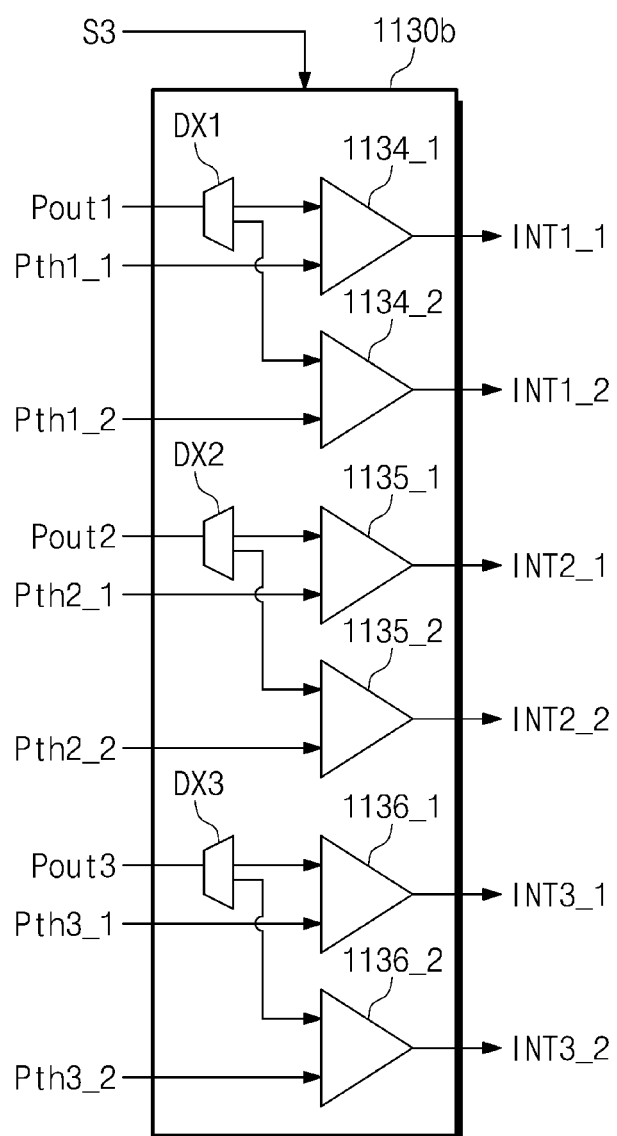
FIG. 14 is a block diagram illustrating an example configuration of a comparing block of FIG. 4.

FIG. 14 is a block diagram illustrating an example configuration of a comparing block of FIG. 4.

The comparing block 1130 of FIG. 4 may include a comparing block 1130b of FIG. 14. The signal Pout of FIG. 4 may include the signals Pout1 to Pout3 of FIG. 14.

Referring to FIG. 14, the comparing block 1130b may include demultiplexers (DeMUX) DX1 to DX3 and comparators 1134_1 to 1136_1 and 1134_2 to 1136_2. The demultiplexers DX1 to DX3 may operate in response to the signal S3 received from the controlling block 1140.

For the operations described with reference to FIG. 9, the demultiplexer DX1 may output the signal Pout1 to the comparator 1134_1 in response to the signal S3. As in the above description, the demultiplexer DX2 may output the signal Pout2 to the comparator 1135_1 in response to the signal S3, and the demultiplexer DX3 may output the signal Pout3 to the comparator 1136_1 in response to the signal S3. Operations of the comparators 1134_1 to 1136_1 are similar to the operations of the comparators 1131 to 1133 described with reference to FIG. 10, and thus, additional description will be omitted to avoid redundancy.

For example, the comparator 1134_1 may compare "Pout1" indicated by the signal Pout1 and the threshold value "Pth1_1", and may output the signal INT1_1 when "Pout1" is greater than "Pth1_1". The comparator 1135_1 may compare "Pout2" indicated by the signal Pout2 and the threshold value "Pth2_1", and may output the signal INT2_1 when "Pout2" is greater than "Pth2_1". The comparator 1136_1 may compare "Pout3" indicated by the signal Pout3 and the threshold value "Pth3", and may output the signal INT3_1 when "Pout3" is greater than "Pth3_1"

For the operations described with reference to FIG. 13, the demultiplexer DX1 may output the signal Pout1 to the comparator 1134_2 in response to the signal S3. As in the above description, the demultiplexer DX2 may output the signal Pout2 to the comparator 1135_2 in response to the signal S3, and the demultiplexer DX3 may output the signal Pout3 to the comparator 1136_2 in response to the signal S3.

The comparator 1134_2 may receive the signal Pout1 from the calculating block 1120 through the demultiplexer DX1, the comparator 1135_2 may receive the signal Pout2 from the calculating block 1120 through the demultiplexer DX2, and the comparator 1136_2 may receive the signal Pout3 from the calculating block 1120 through the demultiplexer DX3. As described with reference to FIG. 10, the threshold voltages "Pth1_2" to "Pth3_2" may be received from the voltage generator or the voltage regulator.

The comparator 1134_2 may compare "Pout1" indicated by the signal Pout1 and the threshold value "Pth1_2" and may output the signal INT1_2 when "Pout1" is less than "Pth1_2". The comparator 1135_2 may compare "Pout2" indicated by the signal Pout2 and the threshold value "Pth2_2" and may output the signal INT2_2 when "Pout2" is less than "Pth2_2". The comparator 1136_2 may compare "Pout3" indicated by the signal Pout3 and the threshold value "Pth3_2" and may output the signal INT3_2 when "Pout3" is less than "Pth3".

Figure 15:
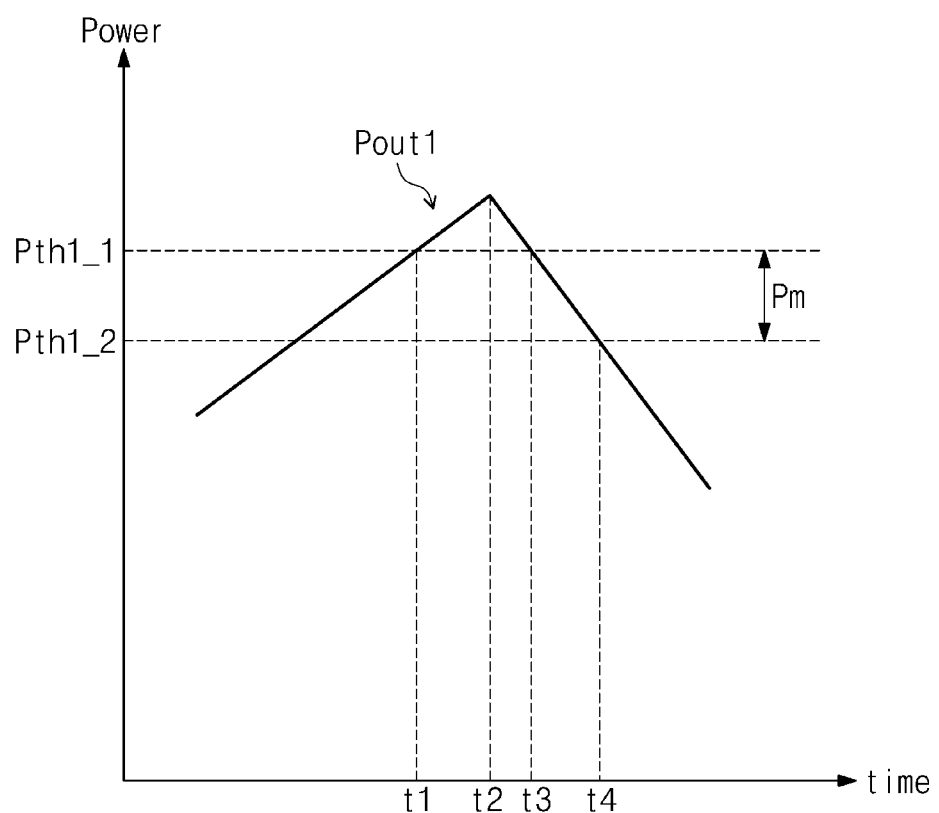
FIG. 15 is a graph illustrating an example signal that is output by a calculating block of FIG. 4.

FIG. 15 is a graph illustrating an example signal that is output by a calculating block of FIG. 4. In an example of FIG. 15, an x-axis represents time, and a y-axis represents power.

Before a time "t1", under control of the DVFS controller 1210_3, power "P1" that is provided to the big core 1251 may increase. Accordingly, "Pout1" that is calculated by the calculating block 1120 may increase.

At the time "t1", "Pout1" may exceed the threshold value "Pth1_1". Accordingly, after the time "t1", operations for outputting the signal INT1_1 may be performed by the PMIC 1100. For example, the operations of FIG. 9 may be performed.

In response to the signal INT1_1 output from the PMIC 1100, control operations of the DVFS controller 1210_3 for limiting power that is consumed by the big core 1251 may be performed. Under control of the DVFS controller 1210_3, the power "P1" that is consumed by the big core 1251 may decrease. Accordingly, after a time "t2", "Pout1" that is calculated by the calculating block 1120 may decrease.

At a time "t4", "Pout1" may decrease to a value that is less than the threshold value "Pth1_2". Accordingly, after the time "t4", operations for outputting the signal INT1_2 may be performed by the PMIC 1100. For example, the operations of FIG. 13 may be performed. In response to the signal INT1_2, control operations of the DVFS controller 1210_3 for limiting power that is consumed by the big core 1251 may be interrupted.

Because the threshold value "Pth1_2" is smaller than the threshold value "Pth1_1" by as much as the reference value "Pm", the signal INT1_2 may be output after the time "t4". For example, in the case where the threshold value "Pth1_2" is identical to the threshold value "Pth1_1" (i.e., in the case where only one threshold value is used to generate the signals INT1_1 and INT1_2), the signal INT1_2 may be output at the time "t3" earlier than the time "t4".

In this case, the PMIC 1100 may significantly frequently output the signals INT1_1 and INT1_2 for controlling the SoC 1200c. In response to the signals INT1_1 and INT1_2, the DVFS controller 1210_3 may significantly frequently change a control operation associated with the big core 1251. Accordingly, the stability of operation of the SoC 1200c may decrease. Accordingly, the stability of operation of the SoC 1200c may increase by setting the threshold value to be less than the threshold value "Pth1_1" as much as the reference value "Pm".

Figure 16:
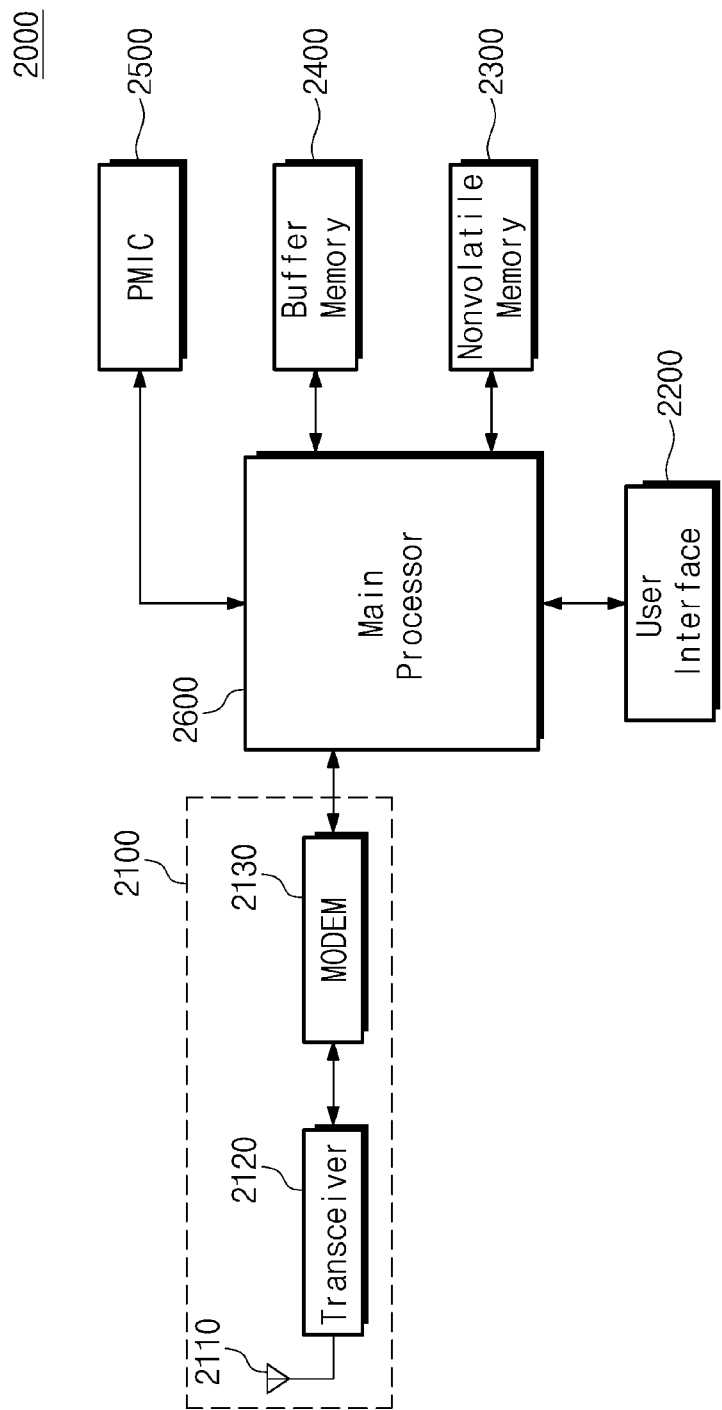
FIG. 16 is a block diagram illustrating an example configuration of an electronic device including a power system of FIG. 1.

FIG. 16 is a block diagram illustrating an example configuration of an electronic device including a power system of FIG. 1.

Referring to FIG. 16, an electronic device 2000 may include a communication block 2100, a user interface 2200, a nonvolatile memory 2300, a buffer memory 2400, a PMIC 2500, and a main processor 2600. However, components of the electronic device 2000 are not limited to the embodiment of FIG. 16. The electronic device 2000 may not include one or more of the components illustrated in FIG. 16 or may further include at least one component not illustrated in FIG. 16.

The communication block 2100 may include an antenna 2110, a transceiver 2120, and a modulator/demodulator (MODEM) 2130. The communication block 2100 may exchange signals with an external device/system through the antenna 2110. The MODEM 2130 may convert a signal received through the antenna 2110. For example, the transceiver 2120 and the MODEM 2130 of the communication block 2100 may process signals, which are exchanged with the external device/system, in compliance with one or more wireless communication protocols.

The user interface 2200 may arbitrate communication between a user and the electronic device 2000. The user may input commands to the electronic device 2000 through the user interface 2200. The electronic device 2000 may provide the user with information generated by the main processor 2600 through the user interface 2200.

The nonvolatile memory 2300 may store data regardless of power supply. For example, the nonvolatile memory 2300 may include at least one of various nonvolatile memories such as a flash memory, a PRAM, an MRAM, a ReRAM, and a FRAM. For example, the nonvolatile memory 2300 may include a removable memory such as a hard disk drive (HDD), a solid-state drive (SSD), or a secure digital (SD) card, and/or an embedded memory such as an embedded multimedia card (eMMC).

The buffer memory 2400 may store data that are used for an operation of the electronic device 2000. For example, the buffer memory 2400 may temporarily store data processed or to be processed by the main processor 2600. For example, the buffer memory 2400 may include a volatile memory, such as a static random-access memory (SRAM), a dynamic RAM (DRAM), or a synchronous DRAM (SDRAM), and/or a nonvolatile memory, such as a flash memory, a phase-change RAM (PRAM), a magneto-resistive RAM (MRAM), a resistive RAM (ReRAM), or a ferro-electric RAM (FRAM).

The PMIC 2500 may power the components of the electronic device 2000. The PMIC 2500 may appropriately convert power received from a battery and/or an external power source and may transfer the converted power to the components of the electronic device 2000. The PMIC 2500 may include the PMIC 1100 of FIG. 1.

For example, the PMIC 1100 may transfer power to a plurality of clusters included in the main processor 2600. Alternatively, the PMIC 1100 may transfer power to a plurality of cores included in the main processor 2600. The PMIC 2500 may output signals for controlling power that is consumed by the main processor 2600. For example, the PMIC 2500 may output a signal for limiting power that is consumed by the main processor 2600. Alternatively, the PMIC 2500 may output a signal for interrupting a control operation which has been performed to limit power that is consumed by the main processor 2600.

The main processor 2600 may control overall operations of the electronic device 2000. For example, the main processor 2600 may include the SoC 1200 of FIG. 1. The main processor 2600 may control/manage operations of components of the electronic device 2000. The main processor 2600 may process various operations for the purpose of operating the electronic device 2000. For example, the main processor 2600 may be implemented with a general-purpose processor, a special-purpose processor, or an application processor.

The power system 1000 which operates based on power calculated by the PMIC 1100 is described above with reference to FIGS. 1 to 16, but the power system 1000 may operate based on any value (e.g., a calculation value) that may be calculated based on a voltage and/or a current. That is, the PMIC 1100 may output the signal INT based on any calculation value, instead of power being the calculation value calculated based on a product of a level of the voltage and a level of the current.

To operate based on any calculation value, the calculating block 1120 may be configured to calculate any calculation value instead of power. In the example of FIG. 8, the calculating block 1120 may include electronic circuits for calculating any calculation values respectively corresponding to the cores 1251 to 1253 instead of the multipliers MX1 to MX3. In this case, the PMIC 1100 may operate based on a "setting value" corresponding to an available power.

For example, the PMIC 1100 may obtain a calculation value associated with a specific component of the SoC 1200 and may compare the obtained calculation value with the setting value. The PMIC 1100 may control the calculating block 1120 and the comparing block 1130 based on a comparison result.

According to an embodiment of the disclosure, a system on chip (SoC) may operate with a high performance and the stability of operation of the SoC may be improved.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

While the disclosure has been described with reference to example embodiments thereof, it will be apparent to those of ordinary skill in the art that various changes and modifications may be made thereto without departing from the spirit and scope of the disclosure as set forth in the following claims.

What is claimed is:

1. A power management integrated circuit (PMIC) comprising:
a converter configured to:
output a first voltage supplied to a first cluster and a second voltage supplied to a second cluster, the first cluster and the second cluster including at least one first core and at least one second core respectively and being included in a System-on-Chip (SoC); and
output first information of a first current supplied to the first cluster and second information of a second current supplied to the second cluster; and
a controller configured to:
receive the first voltage, the second voltage, the first information, and the second information;
calculate a first power supplied to the first cluster based on the first voltage and the first information and a second power supplied to the second cluster based on the second voltage and the second information;
output a first interrupt signal to the SoC in response to the first power exceeding a first available power and a second interrupt signal to the SoC in response to the second power exceeding a second available power;
adjust the first available power based on the first power and/or the second power; and
increase the first available power in response to the second power being less than the second available power.

2. The PMIC of claim 1, wherein the controller increases the first available power as much as a difference between the second available power and the second power.

3. The PMIC of claim 1, wherein the controller maintains the second available power.

4. The PMIC of claim 1, wherein the controller increases the first available power in response to the second power being less than the second available power and the first power being greater than the first available power.

5. The PMIC of claim 1, wherein the controller outputs a third interrupt signal to the SoC in response to the first power being less than a first threshold and a fourth interrupt signal to the SoC in response to the second power being less than a second threshold.

6. The PMIC of claim 1, wherein the converter is further configured to:
output a third voltage supplied to a third cluster and a third information of a third current supplied to the third cluster, the third cluster including at least one third core and being included in the SoC, and
receive the third voltage and the third information, calculate a third power based on the third voltage and the third information, output a third interrupt signal to the SoC in response to the third power exceeding a third available power, and adjust the second available power based on the second power and the third power.

7. The PMIC of claim 6, wherein in response to the third power being less than the third available power, the controller increases the second available power.

8. A System-on-Chip (SoC) comprising:
a first cluster including at least one first core;
a second cluster including at least one second core, the at least one second core having a different performance and/or a different efficiency from a performance and/or an efficiency of the at least one first core;
a controller configured to:
control a first frequency of a first clock signal supplied to the first cluster to control a first power consumed by the first cluster based on a first available power;
control a second frequency of a second clock signal supplied to the second cluster to control a second power consumed by the second cluster based on a second available power; and
increase the first power beyond the first available power in response to the second power being less than the second available power.

9. The SoC of claim 8, wherein the controller allows the first power being over the first available power as much as a power difference between the second available power and the second power.

10. The SoC of claim 8, wherein in response to the second power being less than the second available power and the first power to be consumed by the first cluster being greater than the first available power, the controller allows the first power being over the first available power.

11. The SoC of claim 8, wherein the controller limits:
the first power based on a first interrupt signal received from an external device in association with the first available power, and
the second power based on a second interrupt signal received from the external device in association with the second available power.

12. The SoC of claim 11, wherein the controller interrupts limiting:
the first power based on a third interrupt signal received from the external device in association with a first threshold, and
the second power based on a fourth interrupt signal received from the external device in association with a second threshold.

13. A method of supplying power to a System-on-Chip (SoC) including a first cluster including at least one first core and a second cluster including at least one second core, the at least one second core having a different performance and/or a different efficiency from a performance and/or an efficiency of the at least one first core, the method comprising:
supplying a first power to the first cluster based on a first voltage and a first current;
supplying a second power to the second cluster based on a second voltage and a second current;
limiting the first power in response to the first power exceeding a first available power;
limiting the second power in response to the second power exceeding a second available power;
adjusting the first available power based on the second power; and
increasing the first available power in response to the second power being less than the second available power.

14. The method of claim 13, further comprising increasing the first available power in response to both the second power being less than the second available power and the first power being greater than the first available power.

15. The method of claim 14, wherein the increasing the first available power comprises: increasing the first available power as much as a difference between the second available power and the second power.

16. The method of claim 13, wherein:
the SoC further includes a third cluster including at least one third core, and
the method further comprises:
supplying a third power to the third cluster based on a third voltage and a third current;
limiting the third power in response to the third power exceeding a third available power; and
adjusting the second available power based on the third power.

17. The method of claim 16, wherein the adjusting the second available power based on the third power comprises increasing the second available power as much as a difference between the third available power and the third power in response to both the third power being less than the third available power and the second power to be supplied to the third cluster being greater than the third available power.

18. The method of claim 13, further comprising:
in response to the first power being less than a first threshold, interrupting the limiting the first power in response to the first power exceeding a first available power; and
in response to the second power being less than a second threshold, interrupting the limiting the second power in response to the second power exceeding a second available power.

* * * * *